US010454864B2

(12) United States Patent
Ickman et al.

(10) Patent No.: US 10,454,864 B2
(45) Date of Patent: *Oct. 22, 2019

(54) DELIVERING MESSAGES FROM MESSAGE SOURCES TO SUBSCRIBING RECIPIENTS

(71) Applicant: MICROSOFT TECHNOLOGY LICENSING, LLC, Redmond, WA (US)

(72) Inventors: Steven W. Ickman, Snoqualmie, WA (US); Thomas M. Laird-McConnell, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 129 days.

This patent is subject to a terminal disclaimer.

(21) Appl. No.: 14/257,894

(22) Filed: Apr. 21, 2014

(65) Prior Publication Data
US 2014/0229561 A1 Aug. 14, 2014

Related U.S. Application Data

(63) Continuation of application No. 12/821,683, filed on Jun. 23, 2010, now Pat. No. 8,706,822.

(51) Int. Cl.
*H04L 12/58* (2006.01)
*G06F 9/54* (2006.01)

(52) U.S. Cl.
CPC .......... *H04L 51/12* (2013.01); *G06F 9/542* (2013.01); *H04L 51/14* (2013.01); *H04L 51/32* (2013.01)

(58) Field of Classification Search
CPC ........ G06Q 50/01; G06Q 10/10; G06Q 30/02; G06Q 30/0269; G06Q 10/00; G06Q 10/06;

(Continued)

(56) References Cited

U.S. PATENT DOCUMENTS 5,892,909 A * 4/1999 Grasso et al. ................ 709/201
6,480,885 B1 * 11/2002 Olivier .......................... 709/207

(Continued)

FOREIGN PATENT DOCUMENTS

CN 101090512 A 12/2007
CN 102947799 A 2/2013

(Continued)

OTHER PUBLICATIONS

Restriction/Election Office Action cited in U.S. Appl. No. 12/821,683 dated Jun. 14, 2012, 7 pgs.

(Continued)

*Primary Examiner* — Sargon N Nano
(74) *Attorney, Agent, or Firm* — Newport IP, LLC; Benjamin A. Keim

(57) ABSTRACT

Many scenarios involve the delivery of messages received from various message sources to recipients, based on subscriptions established between various recipients and message sources. The recipients may be distributively assigned to one or more message servers, either operating independently or as part of an interoperating message server set. Respective message servers may generate a subscription filter indicating whether at least one assigned recipient subscribes to respective message sources, and may utilize the subscription filter to determine, upon receiving a message from a message source, whether to discard the message or store the message for delivery. Interoperating message servers may also exchange subscription filters, and upon receiving a message from any message source, a message server may utilize the subscription filters of the other message servers to determine which other message servers are assigned at least one subscribing recipient, and may retransmit the message only to such message servers.

20 Claims, 13 Drawing Sheets

(58) Field of Classification Search
CPC ............ G06Q 20/1235; G06Q 20/145; G06Q 30/0243; G06Q 30/0249; G06Q 30/0251; G06Q 30/0255; H04W 68/005; H04W 48/16; H04W 52/0216; H04W 4/80; H04W 74/06; H04W 74/04; H04W 4/06; H04L 51/12
See application file for complete search history.

(56) References Cited

U.S. PATENT DOCUMENTS

| | | | | |
|---|---|---|---|---|
| 6,912,519 | B2 * | 6/2005 | Shouji | G06F 17/2264 709/206 |
| 7,200,592 | B2 | 4/2007 | Goodwin et al. | |
| 7,353,258 | B2 * | 4/2008 | Washburn | 709/206 |
| 7,376,727 | B2 | 5/2008 | Weller et al. | |
| 7,412,534 | B2 | 8/2008 | Tsang et al. | |
| 7,415,504 | B2 * | 8/2008 | Schiavone et al. | 709/207 |
| 7,548,908 | B2 | 6/2009 | Fu et al. | |
| 7,624,194 | B2 | 11/2009 | Kakivaya et al. | |
| 7,627,570 | B2 | 12/2009 | Bosloy et al. | |
| 7,702,738 | B2 * | 4/2010 | Ahopelto | H04L 51/34 709/206 |
| 7,873,695 | B2 * | 1/2011 | Clegg | H04L 51/12 709/206 |
| 8,010,611 | B2 | 8/2011 | Wang et al. | |
| 8,230,445 | B2 * | 7/2012 | Hope et al. | 719/318 |
| 8,301,889 | B1 * | 10/2012 | Pauker | H04L 9/083 713/171 |
| 8,600,416 | B2 * | 12/2013 | Lin et al. | 455/466 |
| 8,706,822 | B2 * | 4/2014 | Ickman et al. | 709/206 |
| 10,116,621 | B2 * | 10/2018 | Bandini | G06Q 10/00 |
| 2002/0099775 | A1 * | 7/2002 | Gupta | G06Q 10/107 709/205 |
| 2002/0120600 | A1 * | 8/2002 | Schiavone et al. | 707/1 |
| 2002/0120697 | A1 * | 8/2002 | Generous et al. | 709/206 |
| 2003/0101227 | A1 * | 5/2003 | Fink | 709/207 |
| 2003/0217106 | A1 | 11/2003 | Adar et al. | |
| 2003/0229674 | A1 | 12/2003 | Cabrera et al. | |
| 2004/0078447 | A1 | 4/2004 | Malik et al. | |
| 2004/0181588 | A1 | 9/2004 | Wang et al. | |
| 2005/0080861 | A1 | 4/2005 | Daniell et al. | |
| 2005/0080863 | A1 | 4/2005 | Daniell | |
| 2005/0171954 | A1 | 8/2005 | Hull et al. | |
| 2005/0198305 | A1 | 9/2005 | Pezaris et al. | |
| 2005/0210114 | A1 * | 9/2005 | Washburn | 709/206 |
| 2005/0216568 | A1 | 9/2005 | Walkush et al. | |
| 2007/0130255 | A1 | 6/2007 | Wolovitz et al. | |
| 2007/0168550 | A1 | 7/2007 | Wang et al. | |
| 2007/0203995 | A1 | 8/2007 | Wang et al. | |
| 2008/0101265 | A1 | 5/2008 | Osano et al. | |
| 2008/0134202 | A1 | 6/2008 | Craggs et al. | |
| 2008/0183730 | A1 | 7/2008 | Enga | |
| 2008/0183823 | A1 | 7/2008 | Valencia | |
| 2009/0157834 | A1 | 6/2009 | Krishnaswamy | |
| 2009/0240763 | A1 | 9/2009 | Hones et al. | |
| 2009/0254623 | A1 | 10/2009 | Hones et al. | |
| 2009/0328222 | A1 | 12/2009 | Helman et al. | |
| 2010/0017479 | A1 | 1/2010 | Febonio et al. | |
| 2010/0035637 | A1 | 2/2010 | Varanasi et al. | |
| 2010/0257240 | A1 | 10/2010 | Singh et al. | |
| 2011/0004831 | A1 | 1/2011 | Steinberg et al. | |
| 2011/0153759 | A1 | 6/2011 | Rathod | |
| 2011/0161130 | A1 | 6/2011 | Whalen et al. | |
| 2011/0191417 | A1 | 8/2011 | Rathod | |
| 2011/0208822 | A1 | 8/2011 | Rathod | |
| 2011/0219094 | A1 | 9/2011 | Turakhia | |
| 2011/0282957 | A1 | 11/2011 | Wang et al. | |
| 2011/0289433 | A1 | 11/2011 | Whalin et al. | |
| 2012/0016858 | A1 | 1/2012 | Rathod | |
| 2012/0166552 | A1 * | 6/2012 | Seligstein et al. | 709/206 |
| 2014/0280609 | A1 * | 9/2014 | Averbeck | 709/206 |
| 2016/0174221 | A1 * | 6/2016 | Patil | H04L 5/0055 370/329 |

FOREIGN PATENT DOCUMENTS

| | | |
|---|---|---|
| EP | 1130845 A2 | 9/2001 |
| WO | 2008151673 A1 | 12/2008 |
| WO | 2011163145 A2 | 12/2011 |

OTHER PUBLICATIONS

Reply Restriction/Election Office Action cited in U.S. Appl. No. 12/821,683 dated Jul. 15, 2012, 11 pgs.
Non-Final Office Action cited in U.S. Appl. No. 12/821,683 dated Nov. 6, 2012, 17 pgs.
Reply Non-Final Office Action cited in U.S. Appl. No. 12/821,683 dated Jan. 23, 2013, 18 pgs.
Final Office Action cited in U.S. Appl. No. 12/821,683 dated May 29, 2013, 19 pgs.
Reply Final Office Action cited in U.S. Appl. No. 12/821,683 dated Nov. 18, 2013, 17 pgs.
Notice of Allowance cited in U.S. Appl. No. 12/821,683 dated Dec. 6, 2013, 19 pgs.
Int. Preliminary Report cited in PCT Application No. PCT/US2011/041118 dated Dec. 28, 2012, 5 pgs.
"Resolving data from one store against another?" Nov. 20, 2007, reprinted from the Internet at: http://www.sencha.com/forum/archive/index.php/t-18716.html, 4 pgs.
First Chinese Office Action cited in Chinese Application No. 201180030793.6 dated Feb. 28, 2015, 3 pgs.
Second Chinese Office Action cited in Chinese Application No. 201180030793.6 dated Oct. 14, 2015, 7 pgs.
Reply second Chinese Office Action cited in 201180030793.6 dated Dec. 29, 2015, 11 pgs.
Reply first Chinese Office Action cited in Chinese Application No. 201180030793.6 dated Jul. 15, 2015, 22 pgs.
"Search Report Issued in European Patent Application No. 11798717.2", dated Jul. 25, 2017, 4 Pages.
"Office Action Issued in European Patent Application No. 11798717.2", dated: Sep. 25, 2017, 6 Pages.

* cited by examiner

DELIVERING MESSAGES FROM MESSAGE SOURCES TO SUBSCRIBING RECIPIENTS

REFERENCE TO RELATED APPLICATIONS

Pursuant to 35 U.S.C. § 120 and/or 37 C.F.R. § 1.78, the present application claims priority, for the benefit of an earlier filing date, as a continuation of U.S. patent application Ser. No. 12/821,683, filed on Jun. 23, 2010 and also entitled "DELIVERING MESSAGES FROM MESSAGE SOURCES TO SUBSCRIBING RECIPIENTS."

BACKGROUND

Within the field of computing, many scenarios involve a delivery of messages from a set of message sources to a set of recipients, where respective recipients may subscribe to one or more message sources to receive messages therefrom. A first such scenario involves a social network, where each user may subscribe to one or more other users, and where a user may author a message that is to be delivered to each other user subscribing to the author. A second such scenario involves an event publication and subscription model, where a message source (comprising, e.g., an individual, an organization, a device, or a software process) may generate notifications of events, and where various recipients (also comprising, e.g., an individual, an organization, a device, or a software process) may subscribe to a message source to receive notifications of events that are generated by the message source. A message server may be configured to receive messages from various message sources, and to distribute messages to the recipients, either upon request of the recipient (e.g., storing the messages to be delivered to the recipient in a message queue until the recipient requests delivery) or in a push model (e.g., where the message server actively and promptly notifies the recipient upon receiving a message from a message source to which the recipient is subscribed.)

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Challenges may arise in the configuration of a message server to receive a set of messages from various message sources and to deliver the messages to the recipients subscribing to respective message sources. As a first example, the message server may be configured to generate a separate message queue for respective recipients, and upon receiving a message from a message source, to place a copy of the message in the message queue of each recipient subscribed to the message source. However, this example does not scale well, because a message source may have a large number of subscribing recipients (e.g., a popular user in a social network scenario may be subscribed by millions of users), and every message issued by the message source may lead to a very large number of copies of the message. As a second example, the message server may be configured to generate a separate message queue for respective message sources, and, upon receiving a request from a recipient to present messages, to retrieve the messages from the message queue of each message source to which the recipient is subscribed. However, if a message source is subscribed by many recipients, the message server may have to field a very large number of queries for messages from the message source. In either of these examples, scalability is a potential issue; the configurations of the message servers are not readily conducive to adding more message sources, adding more recipients, or managing a high volume of subscriptions of recipients to message sources.

Presented herein are techniques for configuring a message server to handle the delivery of messages from a set of message sources to a set of recipients based on a subscription model. A single message server (such as a single computer) may be configured to receive and store messages for delivery to a set of recipients, and may store, for respective recipients, a recipient profile indicating the message sources to which the recipient is subscribed. The message server may also generate a subscription filter, which may indicate, for respective message sources, whether at least one recipient subscribes to the message source. Upon receiving a message from a message source, the message server may check the subscription filter to determine whether at least one recipient subscribes to the message source of the message. If so, the message source may be configured to receive the message, and to associate the message with the recipients who are subscribed to the message source (based on the recipient profiles of the recipients.) If not, the message source may simply discard the message. When a recipient requests to receive messages, the message server may search the stored messages for those that are associated with the recipient, and may present the associated messages to the recipient. This configuration may be advantageous, e.g., by providing an efficient mechanism for determining whether a particular incoming message is to be kept or discarded, and by enabling a single copy of a message to be stored, even if subscribed by many recipients. Additional efficiency may be achieved, e.g., by implementing the subscription filter as a bloom filter, which may permit space- and processing-efficient determinations.

Additional advantages may be achieved by providing a set of message servers, each assigned a particular set of recipients and storing a recipient profile for respective recipients. The message servers of the message server set may share an assignment map that identifies the message server to which a particular recipient is assigned. Additionally, each message server may share its subscription filter with the other message servers. The message servers may then be configured to, upon receiving a message from a message source, consult the subscription filter of each other message server to determine whether any recipient assigned to the other message server is subscribed to the message source, and may forward the message to the other message server only if at least one recipient assigned to the other message server is subscribed to the message source. In this manner, the message servers may be configured to economize network traffic by sending messages only to message servers having one or more recipients that are subscribed to the message source of the message. Additionally, this configuration promotes the scalability of the message server set, since the capacity may be increased simply by adding new message servers and assigning recipients to the new message servers.

Even greater efficiency may be achieved by assigning similar recipients to the respective message servers, such that the recipients of a message server are more likely to subscribe to similar types of message sources. For example, a message server set comprising a social network may be configured to assign similar groups of recipients to a particular message server, since such similar users are more likely to subscribe to the same message sources (e.g., message authors who are popular among the similar group of users.) As compared with distributing this similar group of users across many message servers, which might involve sending the same messages from the popular message authors to many message servers, this assignment may consolidate the sending and storing of such messages to the one message server to which these similar users are assigned.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
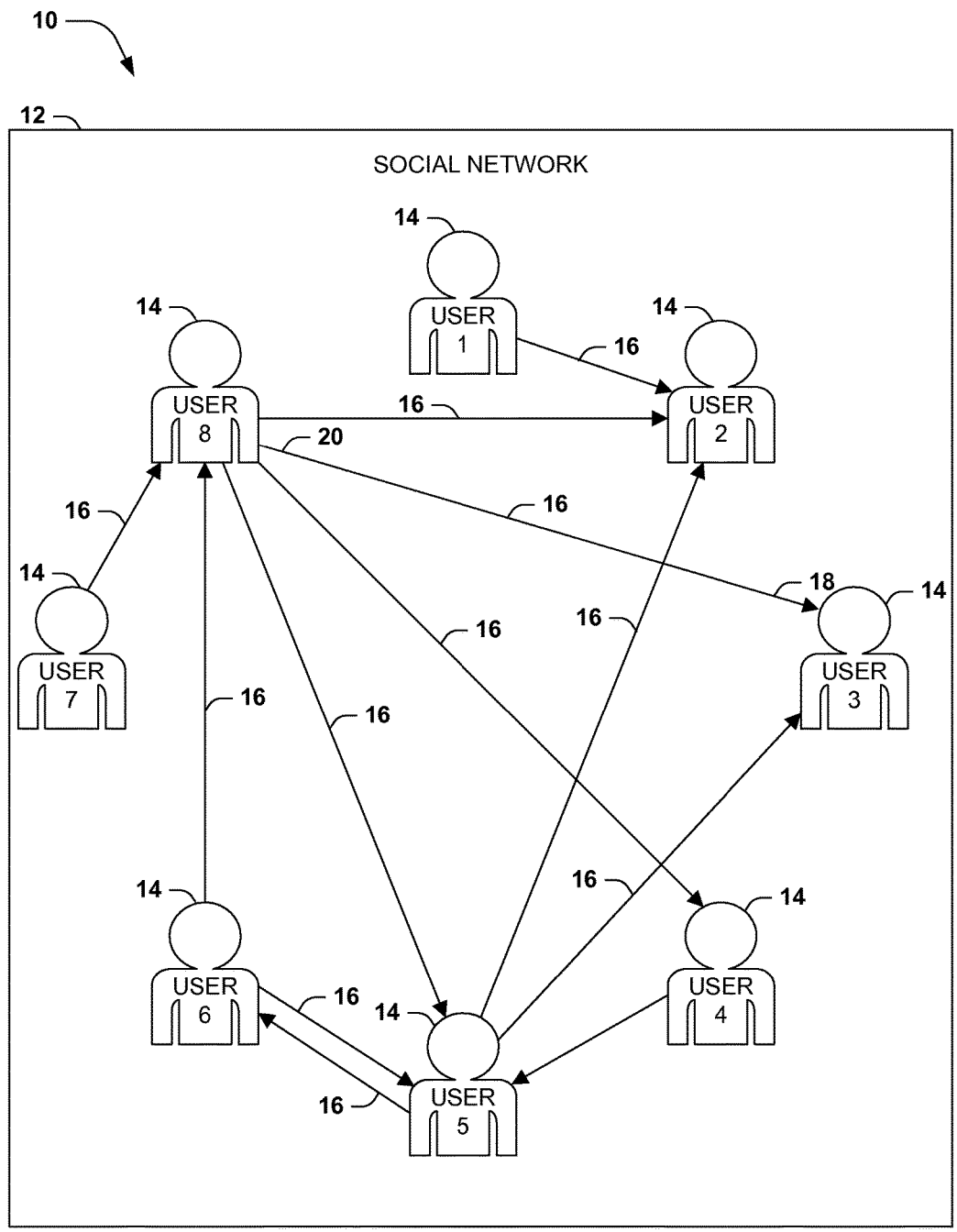
FIG. 1 is an illustration of an exemplary scenario featuring a social network comprising users who subscribe to receive messages from other users.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the delivery of messages from one or more message sources to one or more recipients, based on the subscriptions of respective recipients to one or more message sources. As a first example, a social network may comprise a set of users who author messages, and may permit users to subscribe to other users in order to receive messages authored thereby. As a second example, a set of weblog authors may author posts, and users may subscribe to various weblog authors in order to receive posts issued to the respective weblogs. As a third example, a mailing system may involve a set of mailing lists, and various users may subscribe to one or more of the mailing lists in order to receive the messages of particular mailing lists. As a fourth example, an event publication and subscription system may feature a set of event sources, each of which may raise notifications upon detecting particular events, and various event monitors may subscribe to one or more of the event sources in order to receive notifications of detected events from such event sources.

In these and other scenarios, the message sources and/or recipients may comprise humans, such as individuals, groups of individuals, and organizations such as businesses or academic institutions, or automated agents, such as hardware devices and software processes. Also, in these and other scenarios, the recipients may subscribe to various message sources, or the message sources may select recipients for subscription thereto, or an external agent may define the subscriptions of recipients to message sources. Additionally, some scenarios, the message sources and recipients may comprise different sets of agents, while in other scenarios, one or more of the agents may serve as both message sources and recipients.

Figure 2:
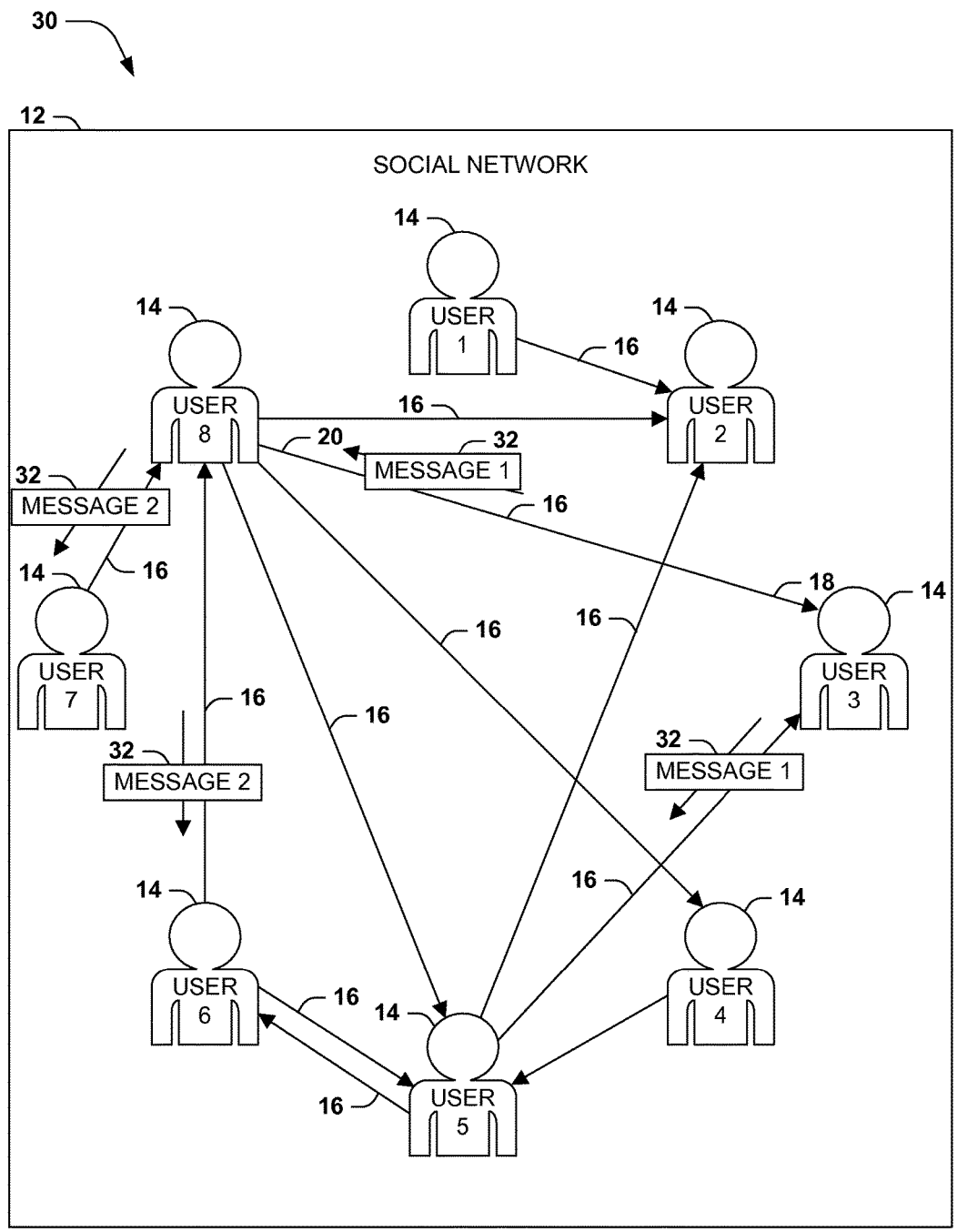
FIG. 2 is an illustration of an exemplary scenario featuring a social network, wherein sending users send messages to receiving users who are subscribed to receive messages from respective sending users.

FIGS. 1-2 together present an exemplary scenario of a delivery of messages from message sources to recipients, and particularly illustrated as a social network 12 comprising a set of users 14. In the exemplary scenario 10 of FIG. 1, respective users 14 may establish subscriptions 16 with other users 14, wherein an arrow from a first user 14 to a second user 14 indicates that the first user 14 (as a recipient 20) subscribes to messages of the second user 14 (as a message source.) Some users 14, such as the eighth user 14, may establish subscriptions 16 with many other users 14; other users 14, such as the second user 14, may be subscribed by many other users 14; and still other users 14, such as the fifth user 14 and the sixth user 14, may establish subscriptions 16 with each other. Thus, the users 14 may establish a web of subscriptions 16.

FIG. 2 presents an exemplary scenario 30 wherein the users 14 and subscriptions 16 illustrated in FIG. 1 may exchange messages 32. For example, when the third user 14 posts a first message 32, the users 14 who are subscribed to the third user 14 (including the fifth user 14 and the eighth user 14) may receive a copy of the message 32. Similarly, when the eighth user 14 posts a second message 32 (which might comprise a copy of the first message 32 that the eighth user 14 wishes to rebroadcast, or a different message 32), the users 14 who have established subscriptions 16 with the eighth user 14 (such as sixth user 14 and the seventh user 14) receive the second message 32. In this manner, messages 32 may be delivered from message sources 18 to recipients 20 based on the web of subscriptions 16 established thereamong.

In order to enable such scenarios, many systems may be devised to accept subscriptions 16 by recipients 20 to message sources 18, and to perform the delivery of messages 32 based on such subscriptions 16. Some systems may present some advantages with respect to other systems, such as ease of implementation or greater efficiency for different scenarios. A significant aspect that may vary considerably among implementations involves scalability of the system in terms of the number of message sources 18, recipients 20, and subscriptions 16 that may be established, and in the number of messages 32 that may be exchanged thereamong, without exhausting the computing resources of the system. Scalability may also be a significant factor in implementations that involve parallel processing, such as a server farm that comprises a set of servers, each configured to handle a portion of the processing tasks of the exchange of messages 32 (e.g., receiving a message 32 from a message source 18, identifying the recipients 20 of the message 32, storing data representing the delivery of the message 32 to the recipients 20, and presenting messages 32 to a recipient 20); some configurations may provide improved performance proportional to additions to the number of servers, while other configurations may provide less or no advantage if new servers are added to the server farm.

Figure 3:
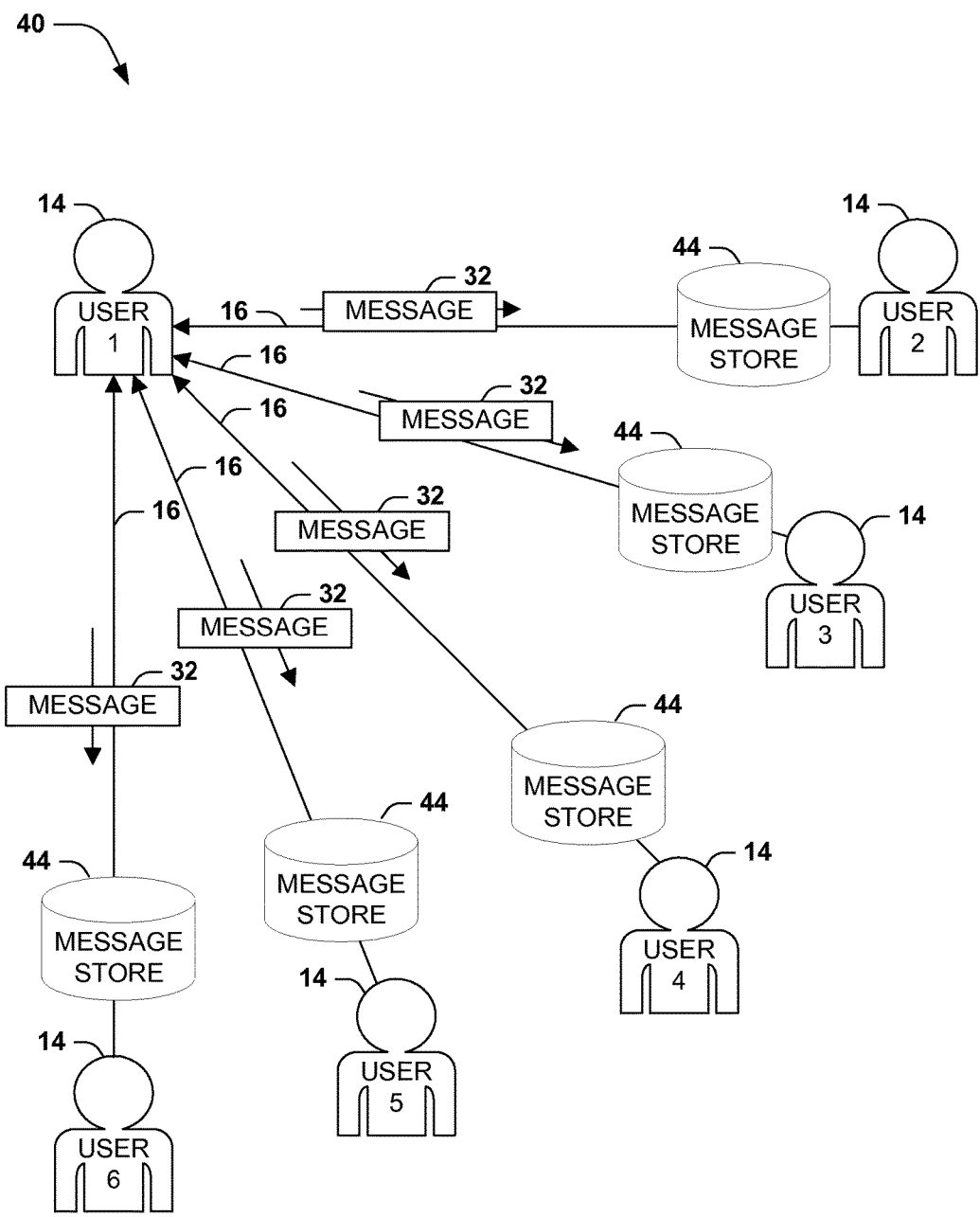
FIG. 3 is an illustration of an exemplary scenario featuring a first configuration of a message server to handle the delivery of messages from a sending user to receiving users.

FIG. 3 presents an exemplary scenario 40 featuring a first configuration of a message server for delivering messages 32 from message sources 16 to recipients 20. In this exemplary scenario 40, the message server is configured in the manner of an email server, where each user 14 is allocated a message store 44 that stores the messages 32 received from message sources 20 to which the user 14 is subscribed, and that are to be delivered to the user 14. When a message source 18 generates a message 32 (in the exemplary scenario of a social network, when a user 14 posts a message 32), a copy of the message 32 is delivered to the message store 44 of each user 14 having a subscription 16 to the message source 18. This configuration may have particular advantages; e.g., this configuration may be easy to implement. In this configuration, messages 32 may also be delivered to recipients 20 easily, quickly, and with low consumption of computing resources, because all messages 32 for the recipient 20 are stored in one location. However, this configuration may also have significant disadvantages. As a first example, significant inefficiency may arise in the duplication of messages 32. In the exemplary scenario 40 of FIG. 3, a single message 32 generated by a single user 14 is stored as five duplicate copies for five recipients 20 who have subscriptions 16 to the first user 14. This duplication may become untenable in scenarios involving a large number of subscriptions 16 to a particular message source 18, such as a celebrity on a social network with whom millions of recipients 20 may have subscriptions 16. In addition to overconsumption of storage space, this scenario may also exhaust network bandwidth; e.g., if the message stores 44 of various recipients 20 who have subscriptions 16 to a prolific celebrity are stored on many different servers in a server farm, millions of copies of every message 32 generated by the celebrity may be transmitted over a local area network connecting the server farm. This duplication may also become unsustainable, e.g., if the messages 32 comprise significant amounts of data, such as videos or other large data objects. Additionally, the performance of this configuration may not be improved by scaling up the number of message servers in the message server set; e.g., the performance-limiting bottleneck of the exemplary scenario 40 of FIG. 3 may be the outbound bandwidth of the server hosting the first user 14.

Figure 4:
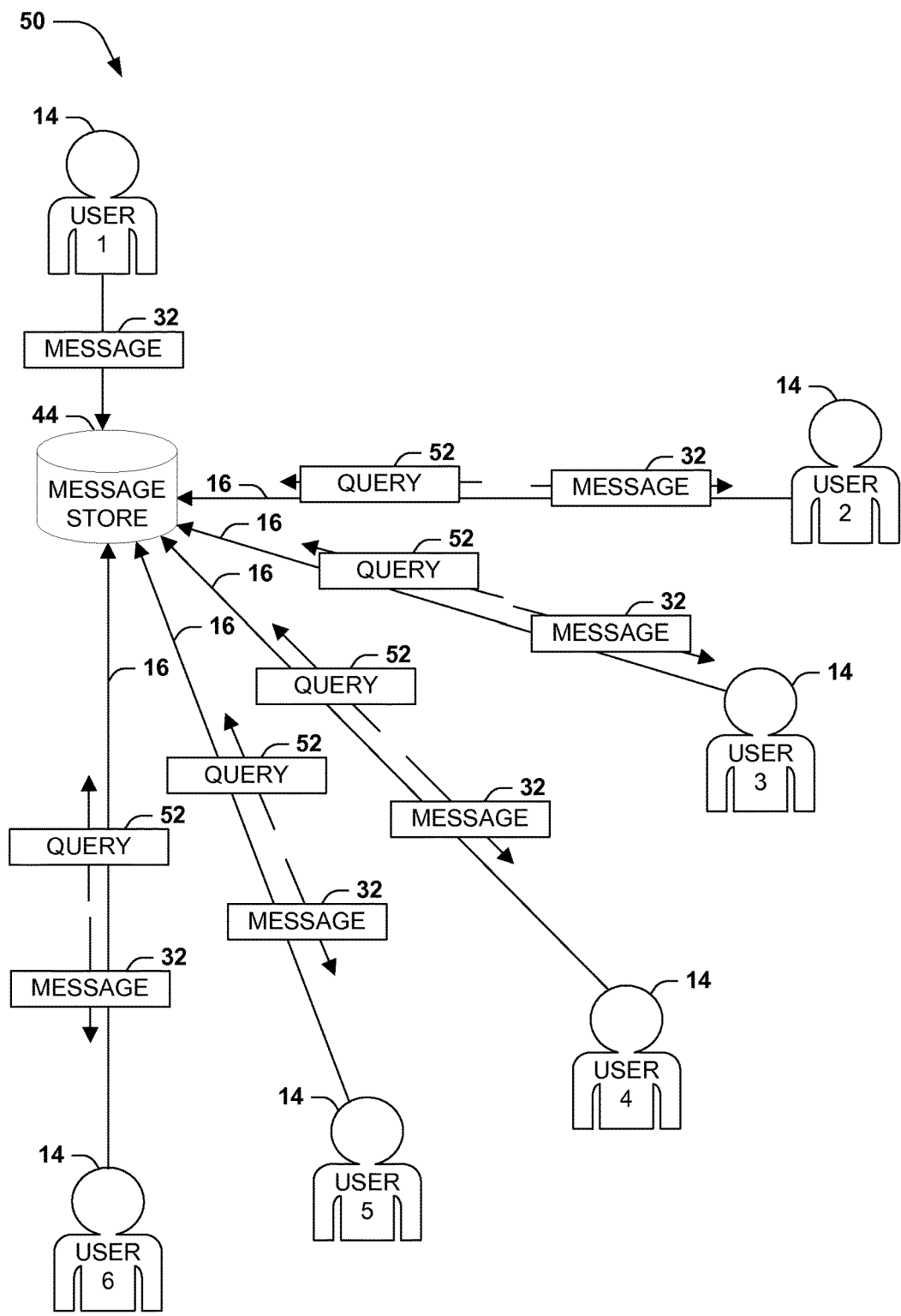
FIG. 4 is an illustration of an exemplary scenario featuring a second configuration of a message server to handle the delivery of messages from a sending user to receiving users.

FIG. 4 presents an exemplary scenario 50 featuring a second configuration of a message server for delivering messages 32 from message sources 16 to recipients 20. In this exemplary scenario 50, the message server is configured in the manner of a webserver, such that the messages 32 of a message source 18 are stored in a message store 44, and when a user 14 requests a presentation of messages 32, the user 14 may query the message store 44 of the respective message sources 18 to which the user 14 has a subscription 16. In comparison with the configuration illustrated in the exemplary scenario 40 of FIG. 3, this configuration may benefit by reducing the storage of duplicate messages 32 in the message store 44, as only one copy is retained. However, this configuration involves many queries of the message store 44 that may be submitted by recipients 20; e.g., when a celebrity user with whom millions of recipients 20 have subscriptions 16 stores a message 32 in a message store 44, the message store 44 may then receive millions of queries from recipients 20 for the new message 32. Again, the outbound network capacity of the message store 44 for the message source 14 may cause a performance-limiting bottleneck, and is not alleviated by adding more message stores 44. Additionally, performance issues may arise when a recipient 20 who has subscriptions 16 to many message sources 18 requests to receive messages 32, because each subscription 16 may result in a separate query to the message store 44 of the respective message source 18. The large number of queries may consume a significant amount of computing and network resources, and the presentation of the messages 32 to the recipient 20 may be delayed during the retrieval of query results for the respective queries.

In view of the deficiencies of the exemplary implementations of FIG. 3 and FIG. 4, it may be appreciated that significant challenges may arise in the implementation of an architecture of a message server that is efficient and prompt; that may scale to support many message sources 18, recipients 20, subscriptions 16, and messages 32 with adequate performance. Additionally, it may be advantageous to choose an architecture that, if implemented on respective message servers of a message server set, presents proportional performance advantages upon expanding to include additional message servers.

Presented herein are techniques for configuring a message server to deliver messages 32 from a set of message sources 18 to a set of recipients 20, based on subscriptions 16 of respective recipients 20 to respective message sources 18. These techniques may be implemented either upon a single message server, or upon respective members of a message server set that interoperate to fulfill such tasks.

Figure 5:
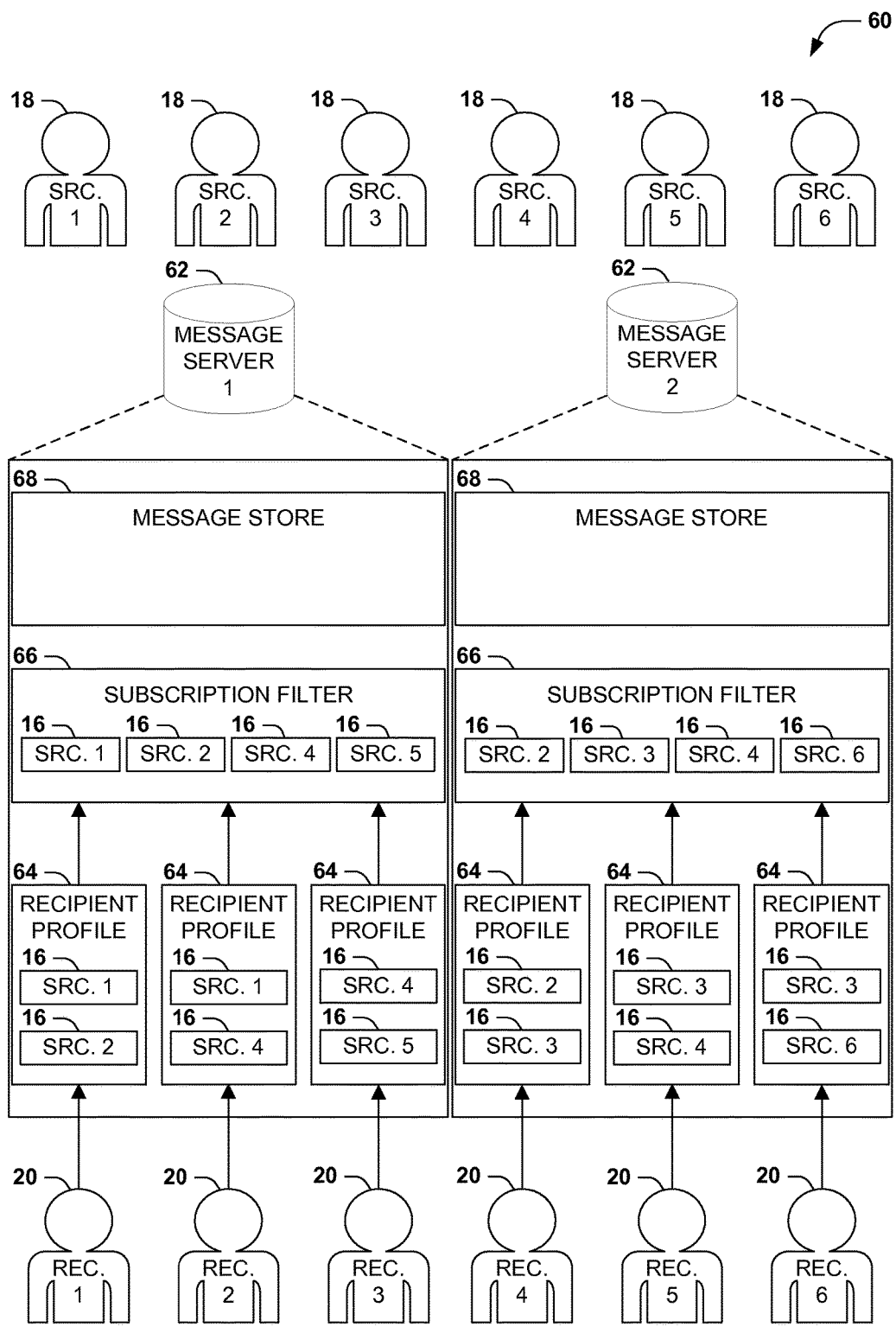
FIG. 5 is an illustration of an exemplary scenario featuring a message server configured to handle the delivery of messages from message sources to recipients in accordance with the techniques presented herein.

FIG. 5 presents an exemplary scenario 60 featuring a set of message sources 18 with which a set of recipients 20 may establish subscriptions 16. The message sources 18 and recipients 20 are illustrated in this exemplary scenario 60 as individuals, but may alternatively comprise groups of individuals, organizations, or automated agents such as devices or software processes. In this exemplary scenario, two message servers 62 are configured to receive messages 32 from the message sources 18 and to deliver the messages 32 to the recipients 20 based on the subscriptions 16 of respective recipients 20 to respective message sources 18. (Some variations of the techniques presented herein involve a collaboration of the message servers 62, but in this exemplary scenario 60, the message servers 62 independently operate to service different sets of recipients 20.) According to the techniques presented herein, the message servers 62 are configured in the following manner. A message server 62 comprises a message store 68, which stores messages 32 received from the message sources 18 and to be delivered to recipients 20. A message server 62 also stores a set of recipient profiles 64 for respective recipients 20, each recipient profile 64 comprising zero or more subscriptions 16 that identify the message sources 18 to which the recipient 20 subscribes. Based on these recipient profiles 64, the message server 62 generate a subscription filter 66 that indicates, for respective message sources 18, whether at least one recipient 20 subscribes to the message source 18. For example, based on the recipient profiles 64 stored by the first message server 62 for a first set of recipients 20, the subscription filter 66 of the first message server 62 indicates that at least one recipient 20 subscribes to each of the first message source 18, the second message source 18, the fourth message source 18, and the fifth message source 18, but that no recipients 20 subscribe to the third message source 18 or the sixth message source 18. By contrast, based on the recipient profiles 64 stored by the second message server 62 for a second set of recipients 20, the subscription filter 66 of the second message server 62 indicates that at least one recipient 20 subscribes to each of the second message source 18, the third message source 18, the fourth message source 18, and the sixth message source 18, but that no recipients 20 subscribe to the first message source 18 or the fifth message source 18. The subscription filter 66 may be implemented in many ways, e.g., as a set of bit flags comprising Boolean values, as a sorted list or binary tree of subscribed message sources 18 (and omitting the other message sources 18 to indicate a lack of such subscription), or a bloom filter.

Figure 6:
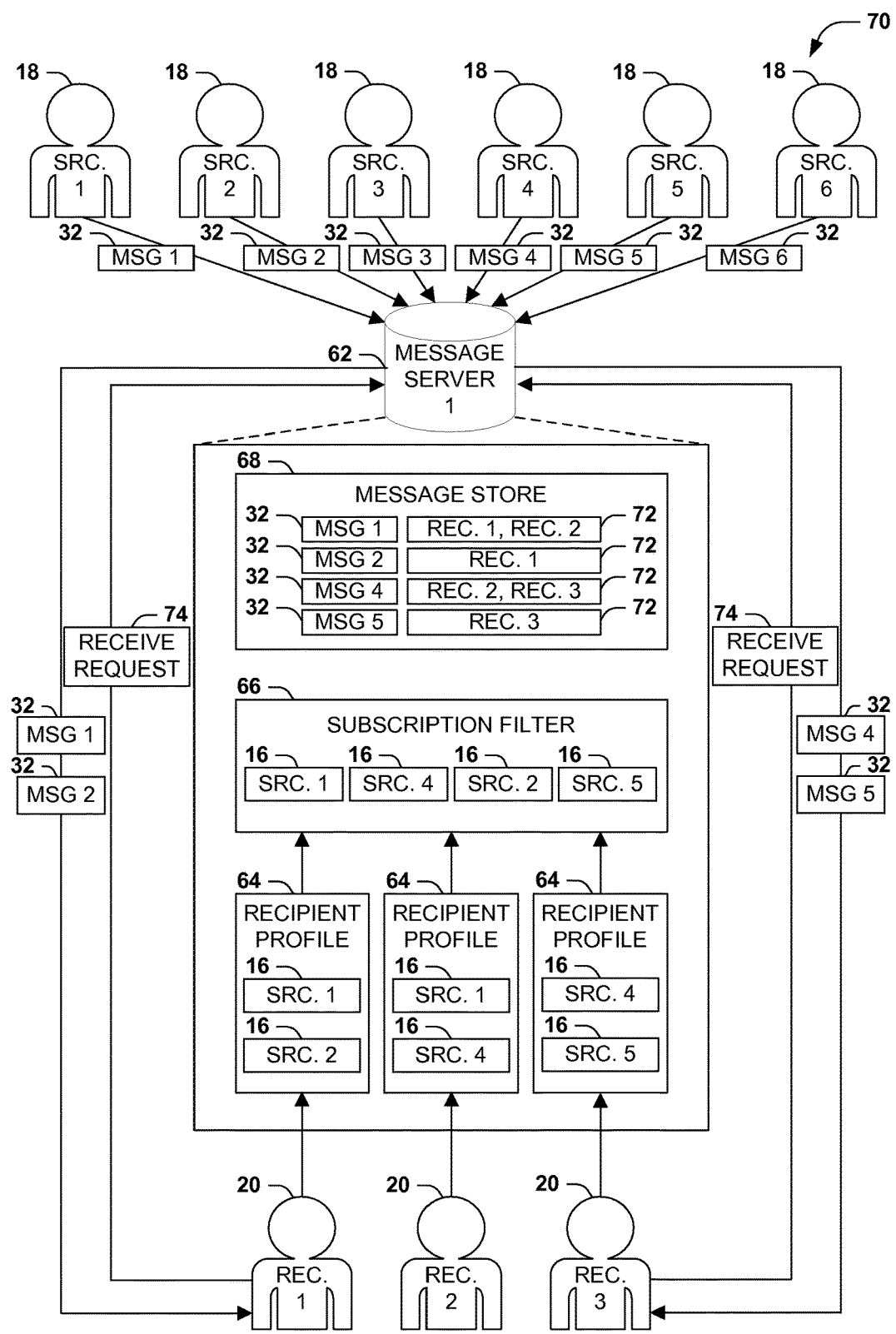
FIG. 6 is an illustration of an exemplary scenario featuring a message server handling the delivery of messages from message sources to recipients in accordance with the techniques presented herein.

FIG. 6 presents an exemplary scenario 70 wherein the first message server 62 illustrated in FIG. 5 and configured accordingly receives and delivers messages 32 from message sources 18 to recipients 20. In this exemplary scenario 70, each message source 18 sends a message 32 to the message server 62, which endeavors to store and organize the messages 32 for delivery upon request to the recipients 20. For respective messages 32 received from respective message sources 18, the message server 62 refers to the subscription filter 66 to determine whether at least one recipient 20 has a subscription 16 to the message source 18. If not, the message server 62 simply discards the message 32. But if at least one recipient 20 is subscribed to the message source 18, the message server 62 stores the message 32 in the message store 68. Moreover, the message server 62 examines the recipient profiles 64 to identify the recipients 20 who are subscribed to the message source 18, and associates the message 32 with such recipients 20, e.g., by annotating the messages 32 with identifiers (such as names) of the recipients 20. Subsequently, upon receiving a request from a recipient 20 to present messages 32 from the message sources 18 to which the recipient 20 is subscribed, the message server 62 may retrieve from the message store 68 the messages 32 that are associated with the recipient 20, and may present the retrieved messages 32 to the recipient 20. For example, when the first recipient 20 submits a receive request 74 to receive messages, the message server 62 may retrieve from the message store 68 the first message 32 and the second message 32, and may present such retrieved messages 32 to the first recipient 20; and when the second recipient 20 submits a receive request 74 to receive messages, the message server 62 may retrieve from the message store 68 the fourth message 32 and the fifth message 32, and may present such retrieved messages 32 to the second recipient 20. In this manner, the message server 62 may be configured to receive, store, and present messages 32 to recipients 20 based on the subscriptions 16 of respective recipients 20 to the message sources 18 of the respective messages 32.

The illustrated implementations in FIGS. 5 and 6 of the techniques presented herein may promote or improve several advantages with respect to implementations of other techniques, such as the implementations presented in FIGS. 3 and 4. As a first example, the use of the subscription filter 66 enables the message server 62 to discard messages 32 that are not deliverable to any recipient 20, thereby economizing the storage space of the message store 68. As a second example, the implementation of FIGS. 5-6 may permit an efficient storage of messages 32, such as by storing one copy of the message 32 for an entire set of recipients 20 serviced by the message server 62, in contrast with the storing of a copy of the message 32 for each subscribing recipient 20 as in the exemplary scenario 40 of FIG. 3. As a third example, the association upon receipt of messages 32 with users 20 promotes the efficient retrieval of messages 32 to be delivered to a particular recipient 20, as opposed to the large number of queries by recipients 20 that may be submitted to the message store 44 of a popular user 14 as in the exemplary scenario 50 of FIG. 4. Indeed, the delivery of messages 32 to a recipient 20 may consume no network resources among the message servers 62 of a message server set, as all of the messages 32 and subscription information utilized in the presentation of messages 32 to the recipient 20 are stored locally by the message server 62. As a fourth example, in scenarios involving a set of message servers 62, the architecture devised by these techniques may be scaled to support additional recipients 20 by introducing additional message servers 62, each configured to service a particular set of recipients 20. For example, in FIG. 5, the first message store 62 services a first set of recipients 20, and the second message store 62 services a second set of recipients 20. While each message server 62 may have to store a duplicate copy of a message 32 if at least one recipient 20 assigned to each message server 62 is subscribed to the message source 18 of the message 32, the number of duplicate messages may be significantly or greatly reduced as compared with storing a copy for every subscribing recipient 14 as in the exemplary scenario 40 of FIG. 3. (While only three recipients 20 are assigned to each message server 62 in the exemplary scenario 60 of FIG. 5, it may be appreciated that a message server 62 may support an assignment of a much larger set of recipients 20, such as hundreds or thousands of recipients 20, and that larger groups of assigned recipients 20 may further reduce the duplication of messages 32.) In this regard, additional efficiency may be achieved by assigning to each message server 62 a group of recipients 20 who subscribe to similar sets of message sources 18 (e.g., based on shared demographic traits, such as age, gender, geographic location, and interests.)

Figure 7:
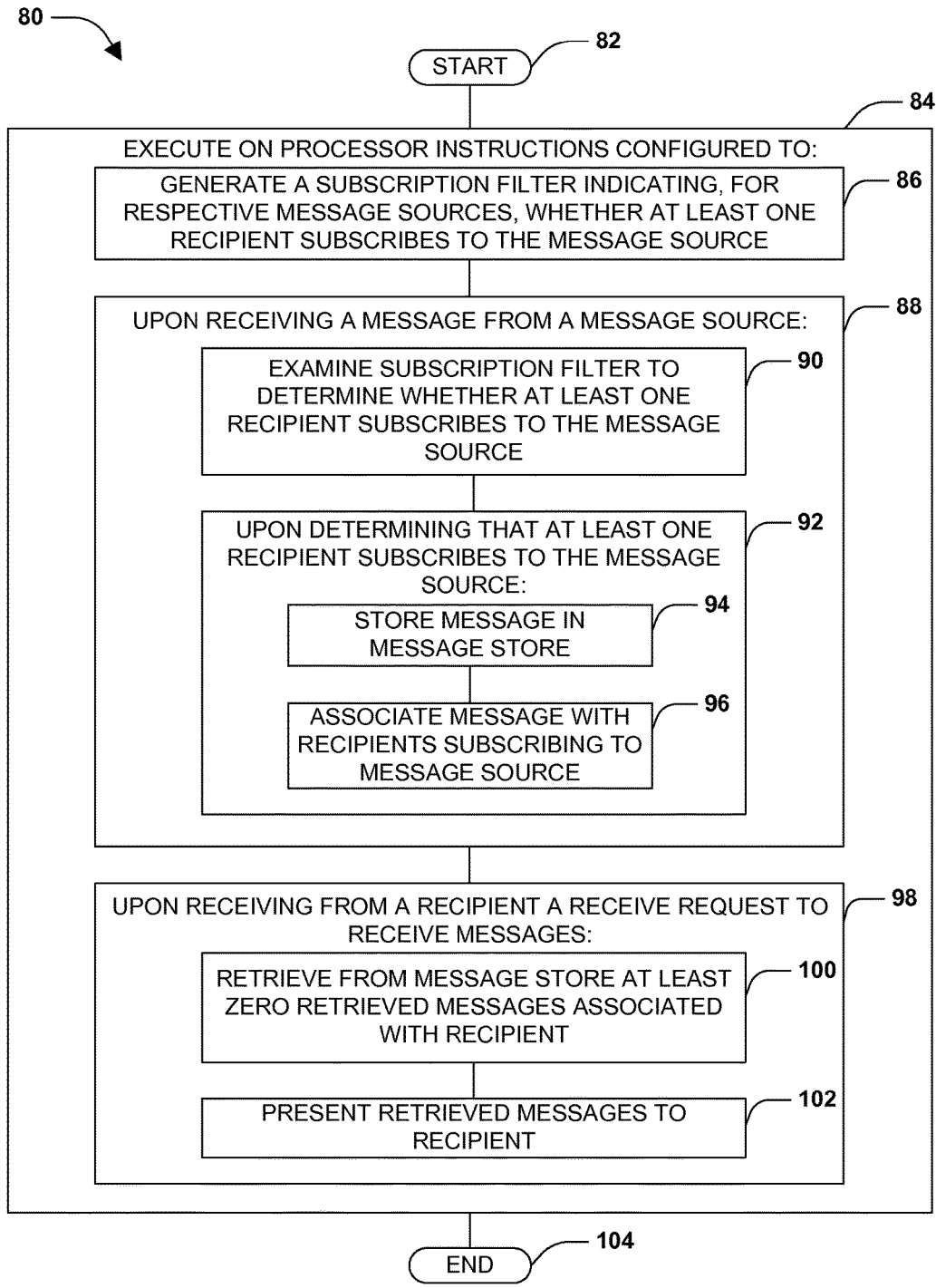
FIG. 7 is a flow chart illustrating an exemplary method of configuring a message server to deliver messages respectively generated by a message source to at least one recipient that is assigned to the message server.

FIG. 7 presents a first implementation of the techniques presented herein, illustrated as an exemplary method 80 of configuring a message server 62 to deliver messages 32 respectively generated by a message source 18 to at least one recipient 20. The message server 62 comprises a device having a processor and a message store 68 that is configured to store messages 32 to be delivered to recipients 20. The message server is also assigned a set of recipients 20, and for each recipient 20 stores a recipient profile 64 configured to identify the message sources 18 subscribed by the recipient 20. The exemplary method 80 begins at 82 and involves executing 84 on the processor instructions configured to perform the techniques presented herein. In particular, the instructions are configured to generate 86 a subscription filter 66 indicating, for respective message sources 18, whether at least one recipient 20 subscribes to the message source 18. The instructions are also configured to, upon receiving 88 a message 32 from a message source 18, examine 90 the subscription filter 66 to determine whether at least one recipient 20 subscribes to the message source 18, and upon determining 92 that at least one recipient 20 subscribes to the message source 18, store 94 the message 32 in the message store 64, and associate 96 with the message 96 the recipients 20 subscribing to the message source 18. The instructions are also configured to, upon receiving 98 from a recipient 20 a receive request 74 to receive messages 32, retrieve 100 from the message store 64 at least zero retrieved messages 32 associated with the recipient 20, and present 102 the retrieved messages 32 to the recipient 20. Having achieved the delivery of messages 32 to recipients 20 based on subscriptions 16 to message sources 18 according to the techniques presented herein, the exemplary method 80 ends at 104.

Figure 8:
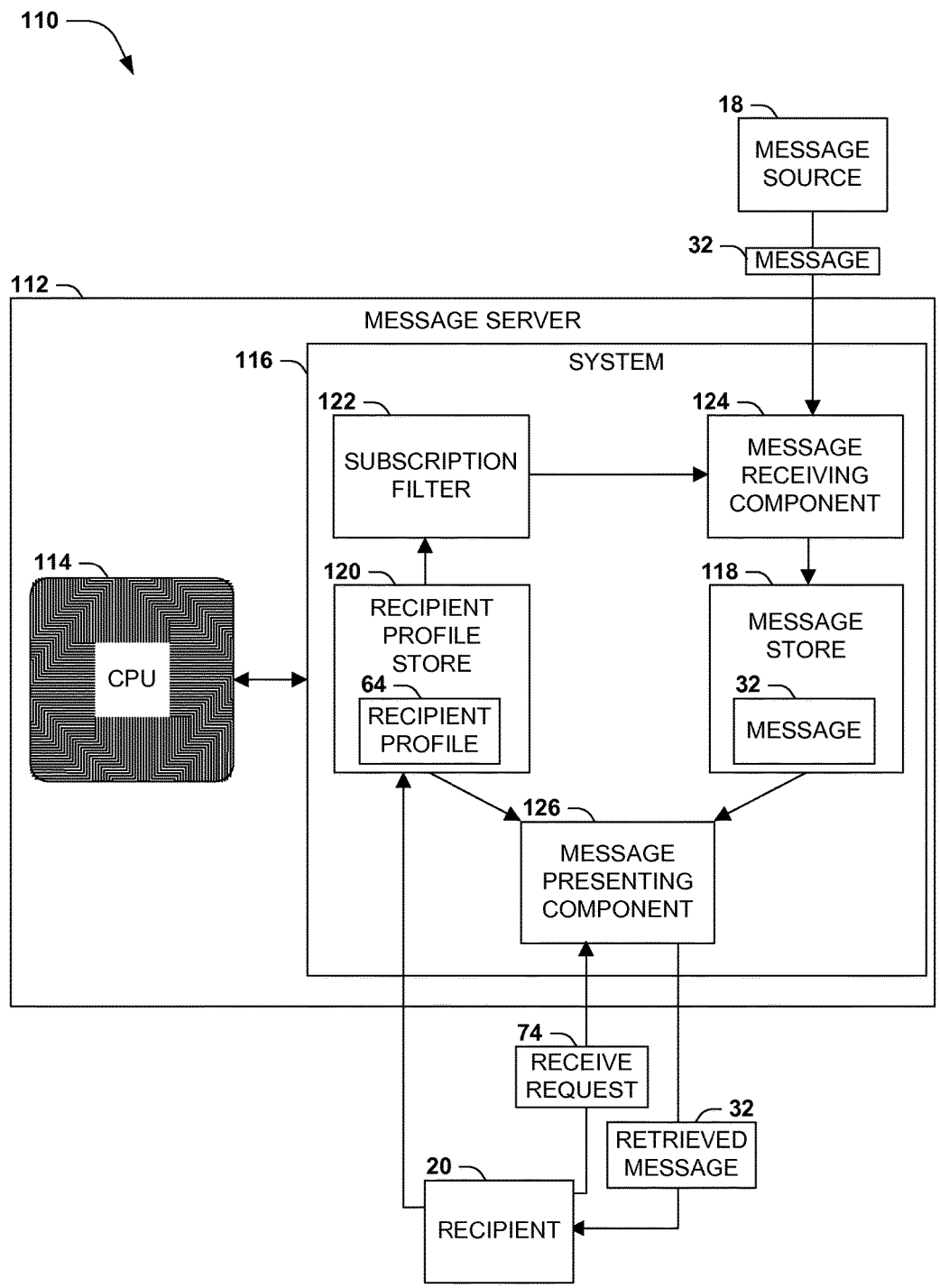
FIG. 8 is a component block diagram illustrating an exemplary system for delivering messages respectively generated by a message source to at least one recipient that is assigned to the message server.

FIG. 8 presents a second embodiment of these techniques, illustrated as an exemplary system 116 operating on a message server 112 and causing the message server 112 to deliver messages 32 to recipients 20 based on subscriptions 16 to various message sources 18. The message server 12 comprises a processor 114, and the exemplary system 116 may be implemented, e.g., as a set of software instructions stored in a volatile memory (such as system RAM) or nonvolatile memory (such as a flash storage device, a hard disk drive, a solid state drive, or an optical disc) that together operate as the architecture of the exemplary system 116. Alternatively, the exemplary system 116 may be implemented as a hardware device, such as a semiconductor circuit or a field-programmable gate array (FPGA) configured to implement the techniques presented herein. The message server 112 is also assigned a set of recipients 20 that have subscriptions 16 with respective message sources 18 in order to receive messages 32 therefrom. The exemplary system 116 comprises a message store 118 configured to store messages 32 for delivery to the recipients 20, and a recipient profile store 120 configured to store recipient profiles 64 identifying the message sources 18 subscribed by the respective recipients 20. The exemplary system 116 also comprises a subscription filter 122 that is configured to indicate, for respective message sources 18, whether at least one recipient 20 subscribes to the message source 18. The exemplary system 116 also comprises a message receiving component 124 that is configured to, upon receiving a message 32 from a message source 18, examine the subscription filter 122 to determine whether at least one recipient 20 subscribes to the message source 18, and upon determining that at least one recipient 20 subscribes to the message source 18, to store the message 32 in the message store 118 and associate with the message 32 the recipients 20 subscribing to the message source 18 (according to the recipient profiles 64 stored in the recipient profile store 120.) The exemplary system 116 also includes a message presenting component 126 that is configured to, upon receiving from a recipient 20 a receive request 74 to receive messages 32, retrieve from the message store 118 at least zero retrieved messages 32 associated with the recipient 20, and present the retrieved messages 32 to the recipient 20. In this manner, the exemplary system 116 may operate similarly to the message stores 62 presented in the exemplary scenario 60 of FIG. 5 and the exemplary scenario 70 of FIG. 6 to deliver messages 32 received from message sources 18 to recipients 20 subscribing thereto.

Figure 9:
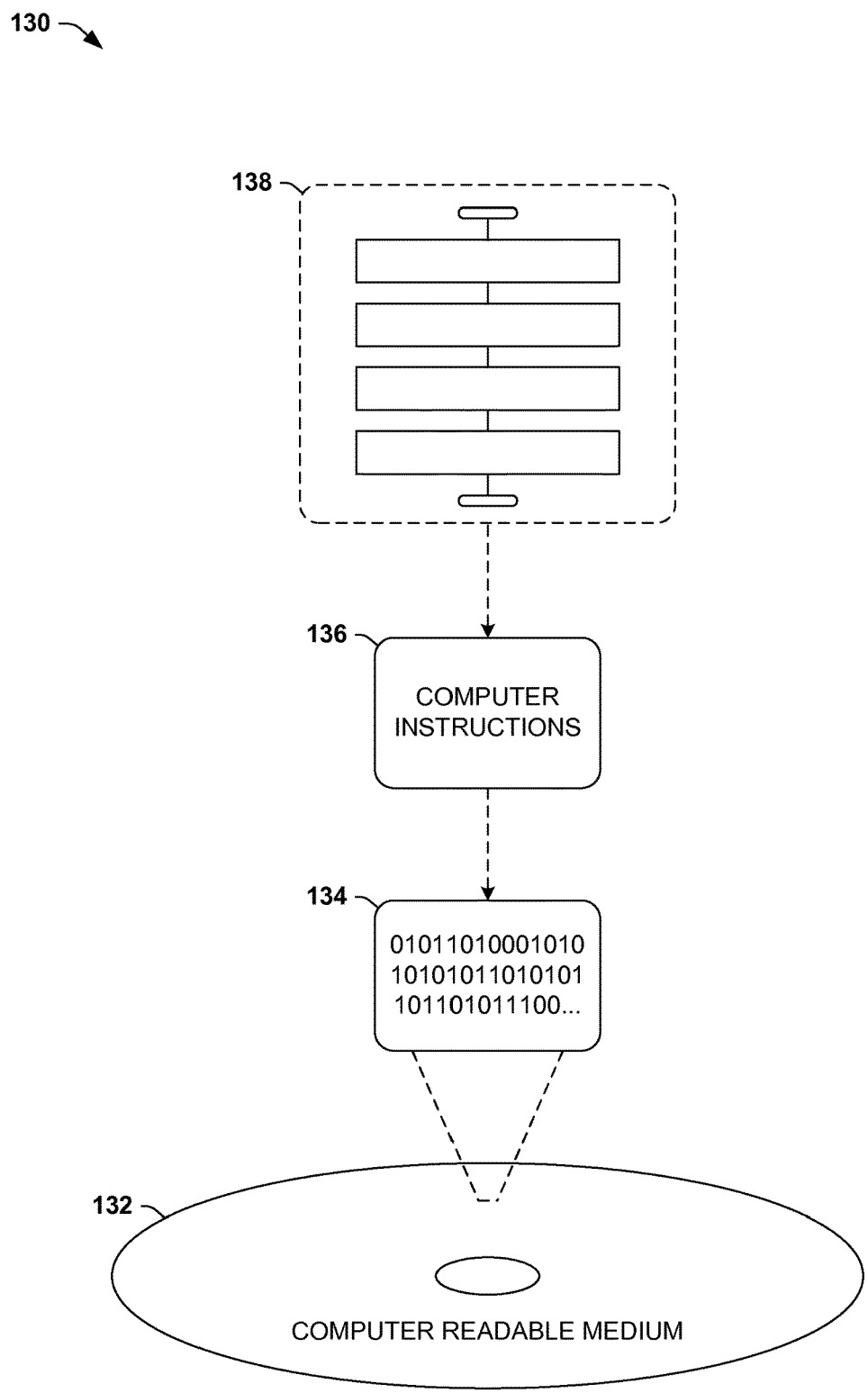
FIG. 9 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 9, wherein the implementation 130 comprises a computer-readable medium 132 (e.g., a CD-R, DVD-R, or a platter of a hard disk drive), on which is encoded computer-readable data 134. This computer-readable data 134 in turn comprises a set of computer instructions 136 configured to operate according to the principles set forth herein. In one such embodiment, the processor-executable instructions 136 may be configured to perform a method of configuring a message server having a processor and a message store to deliver messages respectively generated by a message source to at least one recipient that is assigned to the message server, such as the exemplary method 80 of FIG. 7. In another such embodiment, the processor-executable instructions 136 may be configured to implement a system for delivering messages respectively generated by a message source to at least one recipient that is assigned to the message server, such as the exemplary system 116 of FIG. 8. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques presented herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 80 of FIG. 7 and the exemplary system 116 of FIG. 8) to confer individual and/or synergistic advantages upon such embodiments.

A first aspect that may vary among embodiments of these techniques relates to the scenarios wherein such techniques may be utilized. As a first example, the message sources 18 and recipients 20 may comprise individuals, groups of individuals, organizations such as businesses, academic institutions, and governments, or automated agents, such as devices and software processes. The message sources 18 and recipients 20 may also comprise discrete sets of agents, or at least one recipient 20 may also serve as a message source 18 (e.g., by resending messages 32 received from other message sources 18, and/or by generating new messages 32.) As a second example of this first aspect, the message sources 18 and recipients 20 may exchange messages 32 in many scenarios, such as a conglomeration of content servers (such as webservers), a social network, a business-to-business network, an email exchange system, an instant messaging or other chat network, an event publication/subscriptions network, and a peer-to-peer file exchange network. Additionally, one or more of the message sources 18 may exist outside of the network, such as email messages received from an email sender outside of the network managed by the message server 62. As a third example of this first aspect, these networks may support many types of subscription models, such as recipients 20 requesting to subscribe to message sources 18, message sources 18 creating subscriptions 16 with recipients 20, and other agents defining subscriptions 16 among message sources 18 and recipients 20. As a fourth example of this first aspect, many types of messages 32 may be exchanged, such as status messages, email messages, instant messages, textual writings, images, audio and/or video documents, files, and other digital objects. Those of ordinary skill in the art may devise many scenarios wherein the techniques presented herein may be utilized.

A second aspect that may vary among embodiments of these techniques relates to the architectures wherein such techniques may be implemented. As a first example, these techniques may be implemented as a single message server 62 configured to deliver messages 32 from a set of message sources 18 to a set of recipients 20. Alternatively, the techniques may be implemented on a plurality of message servers 62 comprising a message server set, where each message server 62 may be assigned a distinct set of recipients 20. Additionally, the message servers 62 of the message server set may operate independently of one another (e.g., the message sources 18 may broadcast messages 32 to all message servers 62, each of which may independently determine which messages 32 to deliver to the assigned recipients 20), or may interoperate to improve the efficiency, flexibility, and/or robustness of the message server set. As a second example of this second aspect, a message server 62 may comprise a discrete hardware component, such as a machine or computer server. Alternatively, a message server 62 may comprise a software process implemented on such a machine or computer server, possibly alongside other message servers. For example, a computer server may implement and concurrently execute a set of virtual machines or processes, each implementing a message server 62 to which a discrete set of recipients 20 is assigned. As a third example of this second aspect, these techniques may be implemented as a method, such as the exemplary method 80 of FIG. 7; however, the elements of such methods may be implemented in a different configuration. As a fourth example of this second aspect, these techniques may be implemented as a system, such as the exemplary system 116 of FIG. 8; however, the components of the system implementing these techniques may vary, or may be implemented in a different configuration. Those of ordinary skill in the art may devise many architectural variations in the implementations of the techniques presented herein.

A third aspect that may vary among embodiments of these techniques relates to the manner of establishing or removing a subscription 16 of a recipient 20 with a message source 18. A first embodiment of these techniques may disallow, or simply not support, alterations to the subscriptions of recipients 20 with message sources 18. For example, the subscriptions 16 may be comparatively static, or may be defined by another system or component, such as where the recipient profiles 64 are managed by another system. The embodiment may therefore be configured to route messages 32 according to the static map of subscriptions 32, and may therefore generate the subscription filter 66 for use in deliver the messages 32 according to the static map. Alternatively, an embodiment may be configured to allow alterations to the subscriptions 32 of recipients 20 to message source 18. For example, upon receiving a subscribe request from a recipient 20 to subscribe to a message source 18, the embodiment may be configured to update the recipient profile of 64 the recipient 20 to identify the message source 18 subscribed by the recipient 20, and to update the subscription filter 66 to indicate that at least one recipient 20 subscribes to the message source 18. Conversely, upon receiving an un subscribe request from a recipient 20 to unsubscribe from a message source 18, the embodiment may be configured to update the recipient profile of 64 the recipient 20 to identify that the message source 18 is not subscribed by the recipient 20, and may remove the message source 18 from the subscription filter 66 if no other recipients 20 are subscribed to the message source 18. Alternatively or additionally, embodiments may accept and apply subscribe requests and unsubscribe requests defined by other sources; e.g., message sources 18 may request to add or remove subscriptions 16 for particular recipients 20, or recipients 20 subscribing to a message source 18 may request the addition of other recipients 20 as subscribers of the same message source 18 in a subscription referral model. Those of ordinary skill in the art may devise many ways of supporting subscribe requests and unsubscribe requests while implementing the techniques presented herein.

A fourth aspect that may vary among embodiments of these techniques relates to the implementation of the subscription filter 66 that indicates, whether at least one recipient 20 subscribes to each message source 18. As a first example, the subscription filter 66 may simply comprise a set of Boolean values, such as a bit array, indicating whether at least one recipient 20 managed by the message server 62 has established a subscription 16 with the message source 18. As a second example of this fourth aspect, the subscription filter 66 may indicate the number of subscribing recipients 20, such as an integer array; this may be advantageous, e.g., for allowing a rapid updating of the subscription filter 66 in response to an unsubscription of a recipient 20 from a message source 18 by simply decrementing the count of subscribing recipients 20. As a third example of this fourth aspect, the subscription filter 66 may additionally indicate which recipients 20 are subscribed to a particular message source 18, such as an array of references to the recipient profiles 64 of subscribing recipients 20. This implementation of the subscription filter 66 may incorporate aspects of the recipient profile 64, and may be advantageous, e.g., for determining not only whether a recipient 20 is subscribed to a message source 18, but also for identifying the subscribing recipients 20 in order to associate 96 a message 32 therewith. For example, if the subscription filter 64 indicates, for a particular message source 32, a list of references to recipients 20 (or the recipient profiles 64 thereof) who are currently subscribed to the message source 32, a message 32 may be associated with the recipients 20 by appending a copy of the list of references to the message 32. This copying might be performed in bulk to expedite the associating 96, particularly if a large number of recipients 20 are subscribed to the message source 18, and may be computationally more efficient than other variations (e.g., querying a database for records associating a message 32 with subscribing recipients 20.) Additionally, this implementation may be comparatively easy to update in view of changes to the subscriptions 16 of the recipients 20. However, the scalability of this variation may be difficult to manage; e.g., if many message sources 18 are subscribed by many recipients 20, the embodiment many have to store many copies of lengthy lists of references to subscribing recipients 20, which may not be an efficient or feasible use of storage space.

A fourth example of this third aspect involves the implementation of the subscription filter 66 as a bloom filter, which permits the storage of a large amount of data in a compact manner, while also permitting rapid retrieval of data. A traditional implementation of a bloom filter allows any input value to be initially (and by default) associated with a result value of False, but to allow particular input values to be set to True. An array, such as a bit array, may be utilized as a storage structure for storing the result values corresponding with various input values. The bloom filter is also associated with a set of hash functions that map input values to particular indices within the bit array. For example, if a bit array of eight kilobytes (65,536 bits) is selected, a set of hash functions may be provided that, according to different mathematical formulae, map an input value arbitrarily to a value between 0 and 65,535. Initially, the entire bit array is initialized to zero, indicating that every input value is associated with a result value of False. When a particular input value is to be stored as True, the value is processed by all hash functions, and the bit values at the index computed by each hash function is set to one. In order to extract the result value for a particular input value, the input value is again processed by all hash functions, and the bit values at the respective indices are retrieved and compared. If all of the bit values are set to one, then the input value is probably stored in the bloom filter with a result value of True; but if any one bit value is set to zero, the value is definitely stored in the bloom filter with a result value of False (or is not stored in the bloom filter at all, thereby resulting in a default result value of False.) Improvements of the traditional bloom filter may present additional features, such as improved accuracy or storage density, quicker retrieval, or the capability of removing values from the bit array.

Figure 10:
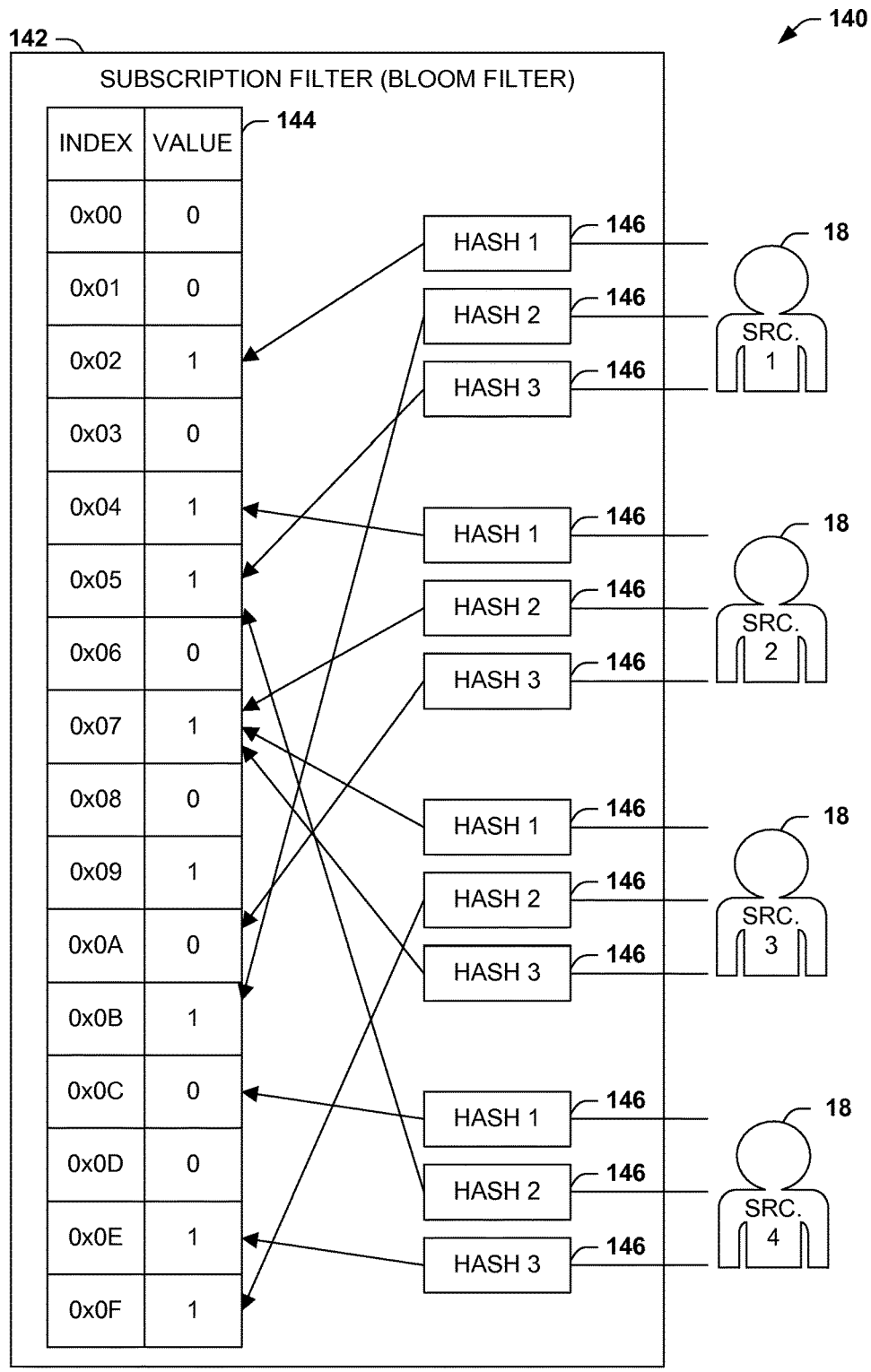
FIG. 10 is an illustration of an exemplary scenario featuring the use of a bloom filter as a subscription filter.

In view of these properties of a bloom filter, a variation of these techniques may implement the subscription filter 66 as a bloom filter. FIG. 10 presents an exemplary scenario 140 featuring this variation, wherein the subscription filter 66 is implemented as a bloom filter 142, comprising a bit array 144 and a set of three hash functions 146. Various message sources 18 may be recorded in the bloom filter 142 as being subscribed by one or more recipients 20 by setting values in the bit array 144 in the following manner. Initially, the values of a length-16 bit array 144 are set to zero to indicate that no message sources 18 have any subscribing recipients 20. A message source 18 may have a distinctive identifier, such as a name or an integer. When the message source 18 is to be recorded in the subscription filter 66 as having at least one subscribing recipient 20, the identifier is processed by all three hash functions 146, each of which returns a numeric hash value between 0 and 15 that corresponds to an index in the length-16 bit array 144, and the value at the respective index is set to one (disregarding its previous value of zero or one.) When a message 32 is received and a determination is to be made whether the message source 18 of the message 32 has any subscribing recipients 20, the identifier of the message source 18 may again be processed by the hash functions, and the values at the indices computed by the hash functions may be compared (e.g., through a bitwise AND) to determine whether all such values are one. If so, the message source 18 is determined to (probably) have at least one recipient 20, so the message 32 may be stored in the message store 68; but if not, the message 32 may be discarded.

In the exemplary scenario 140 of FIG. 10, if a message 32 is received from the first message source 18 is received, the identifier of the message source 18 may be processed by the three hash functions 146 of the bloom filter 142 resulting in the numeric hash values 2, 11, and 5, corresponding to array indices 0x02, 0x0B, and 0x05. The values in the bit array 144 at these array indices may be examined; since all three values are 1, the bloom filter 142 indicates that the message source 18 is subscribed by at least one recipient 20, and the message 32 may be stored. By contrast, when a message 32 is received from the second message source 18, the identifier of the second message source 18 is processed by the hash functions 146, and the values at corresponding array indices 0x04 and 0x07 are found to equal one, but the value at array index 0x0A (indicated by the third hash function 146) is found to equal zero; accordingly, the second message source 18 is determined to have no subscribing recipients 32, and the message 32 from the second message source 18 may be discarded.

The use of a bloom filter 142 as a subscription filter 66, such as illustrated in the exemplary scenario 140 of FIG. 10, may be advantageous for permitting the storage of a large amount of subscription information about a large number of message sources 18 in a compact manner, while still permitting comparatively rapid retrieval of the subscription information (e.g., compared with querying every recipient profile 64 to locate at least one subscribing recipient 20.) The traditional bloom filter 142 may present some limitations, but these limitations may be tolerable for a subscription filter 66. As a first example, the bloom filter 142 may return false positive results; e.g., for a particular input value that has not yet been stored with a result value of True, each of the hash functions 146 may indicate an array index that has previously (for a different input value) been set to one, and may coincidentally produce an incorrect result value of True. As a second example, once an input value is associated in a traditional bloom filter 142 with a result value of True, it often cannot be reset to False by setting the corresponding values in the bit array 144 to zero, as this resetting may cause other input values that have previously been associated with a result value of True may be unintentionally set to False, subsequently causing a false negative result for the corresponding message sources 18 and the incorrect discarding of messages 32 that are deliverable to one or more subscribing recipients 20.

However, in both cases, the consequences of a false positive result of a bloom filter 142 (either because the message source 18 has never had any subscribing recipients 20, or because all subscribing recipients 20 have unsubscribed) involves the storing of a single undeliverable message 32 in the message store 68, which may represent a trivial and acceptable inefficiency. This inefficiency may be avoided with additional processing; e.g., while associating 96 the message 32 with subscribing recipients 20 (according to the recipient profiles 64), it may be determined that no subscribing recipients 20 exist, and the message 32 may then be discarded. Conversely, the traditional bloom filter does not produce false negatives, so messages 32 that are deliverable to one or more subscribing recipients 20 are not incorrectly discarded. Moreover, if the bloom filter 142 becomes unacceptably inaccurate (e.g., yielding too many false positives), the bloom filter 142 may be regenerated based on the current recipient profiles 64. This regenerating may erase the effects of previously subscribed but currently unsubscribing recipients 20. Moreover, false positives may be reduced by choosing a different set of hash functions 144 for the bloom filter 142 during the regenerating. In a first such embodiment, the regenerating may be performed promptly to reduce inaccuracies caused by unsubscribing recipients 20; e.g., upon receiving an unsubscribe request from a recipient 20 to unsubscribe from a message source 18, a message server 62 may update the recipient profile 64 of the recipient 20 to identify the message source 18 as not subscribed by the recipient 20, and may also regenerate the bloom filter 142 based on the (updated) recipient profiles 64 of the message server 62. Similarly, upon receiving a removal request to remove a recipient 20 from the message server 62 (e.g., to deactivate or close an account), the message server 62 may remove the recipient profile 64 of the recipient 20, and may regenerate the bloom filter 142 based on the remaining recipient profiles 64 of the message server 62. when the However, the regenerating may be a computationally costly endeavor, and may be performed periodically, or upon detecting a particular level of inefficiency-inducing inaccuracies in the bloom filter 142 (e.g., upon detecting a particular number of false positives during the associating 96 of messages 32 with recipients 20.) Alternatively, improved versions of the bloom filter 142 may be utilized to address these limitations; e.g., a "bloomier filter" may be utilized to eliminate false positive result values reported by the bloom filter 142. Those of ordinary skill in the art may devise many variations of the subscription filter 66 while implementing the techniques presented herein.

The techniques described herein may be embodied in the configuration of a single, standalone message server 62 (e.g., as in the exemplary scenario 70 of FIG. 6, where a single message server 62 delivers messages 32 received from a set of message sources 18 to various subscribing recipients 20), or in a plurality of message servers 62 that independently service different recipients 20 and/or message sources 18 (e.g., as in the exemplary scenario 60 of FIG. 5, where two message servers 62 service discrete and non-overlapping sets of recipients 20.) However, some variations of these techniques involve the configuration of a plurality of message servers 62 of a message server set in an interoperative manner. In these scenarios, a body of recipients 20 may be distributed among various message servers 62, such as by assigning respective recipients to a particular message server 62 that hosts the recipient profile 64 of the recipient 20 and/or the messages 32 to be delivered to the recipient 20. The message servers 62 may also share an assignment map, which indicates the assignment of respective recipients 20 to a particular message server 62 in the message server set. Each message server 62 may comprise a discrete computer system among a set of interoperating computer systems, and/or a software process operating on such a computer system, possibly concurrently or in series with other software processes representing other message servers 62 operating on the same computer system. A first message server 62 may utilize the assignment map to determine the message server 62 to which a particular recipient 20 is assigned, in order to either handle requests received from the recipient 20 or to forward such requests or refer the recipient 20 to a second message server 62.

Figure 11:
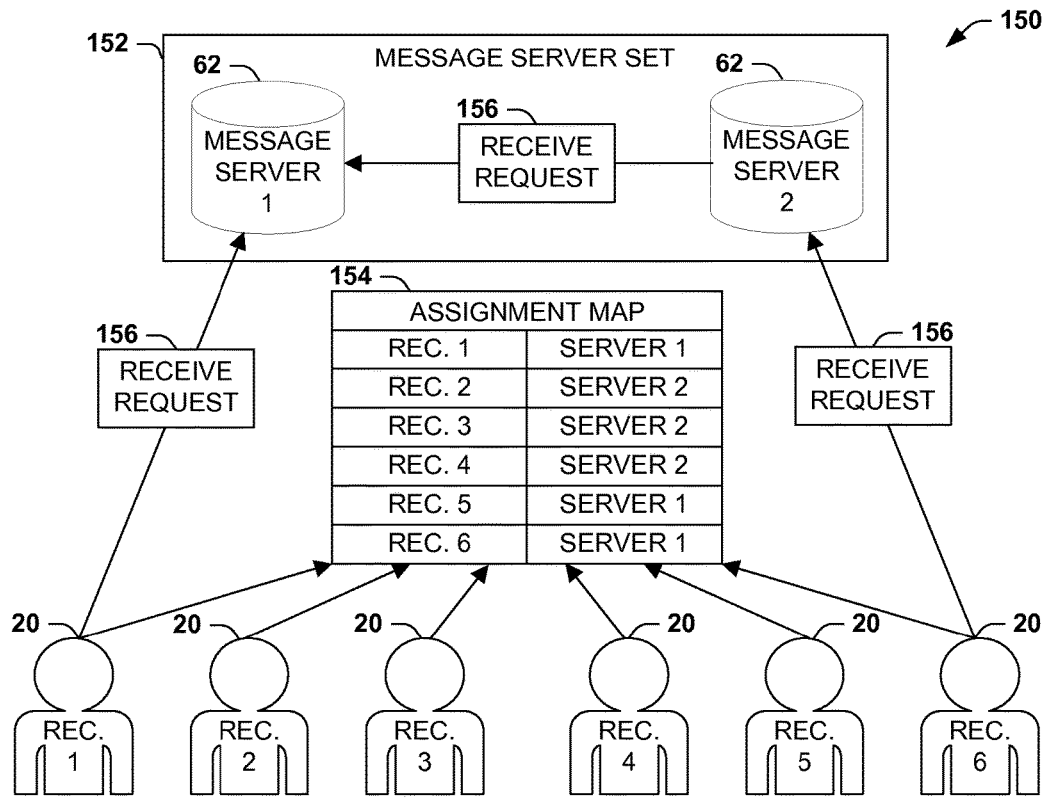
FIG. 11 is an illustration of an exemplary scenario featuring two message servers interoperating in a message server set.

FIG. 11 presents an exemplary scenario 150 featuring a message server set 152 comprising a two message servers 62. In contrast with the message servers 62 in the exemplary scenario 60 of FIG. 5 (which independently deliver messages 32 to discrete and non-overlapping sets of recipients 20), in this exemplary scenario 150, the message servers 62 are configured to interoperate. A set of recipients 20 is distributively assigned to the message servers 62, such that for any recipient 20, a particular message server 62 may store a recipient profile 64, may store messages 32 to be delivered to the recipient 20, and may fulfill receive requests 156 to deliver stored messages 32 to the recipient 20. For example, the first message server 62 may be assigned a first recipient 20, and may store any messages 32 received from various message sources 18 to which the first recipient 20 subscribes. Moreover, the message servers 62 may share an assignment map 154 indicating to which message server 62 a particular recipient 20 is assigned, and may utilize the assignment map 154 in the following manner. Upon receiving from the first recipient 20 a receive request 156 to receive messages 32, the first message server 62 may examine the assignment map 154 to determine identify a recipient message server to which the first recipient 20 is assigned. Upon determining that the first recipient 20 is assigned to the first message server 62, the first message server 62 may fulfill the receive request 156 by retrieving from the message store 68 of the first message server 62 any messages 32 associated with the first recipient 20, and may present the retrieved messages 32 to the first recipient 20. By contrast, when a sixth recipient 20 sends a receive request 156 to the second message server 62 (which is configured in a similar manner), the second message server 62 may examine the assignment map 154 to determine identify the recipient message server to which the sixth recipient 20 is assigned, and may determine that the recipient message server to which the sixth recipient 20 is assigned is the first message server 62. Accordingly, instead of endeavoring to fulfill the receive request 156 of the sixth recipient 20, the second message server 62 may simply forward the receive request 156 to the first message server 62. In this manner, the message servers 62 of the message server set 152 may interoperate to deliver messages 32, assignments of recipients 20 to respective message servers 62. This configuration may also promote the scalability and work-sharing of the message server set 152, as any message server 62 may receive and initially review a receive request 156 from any recipient 20.

A fifth aspect that may vary among embodiments of these techniques, and in particular for embodiments involving a configuration of respective message servers 62 of a message server set 152, relates to the manner of adding recipients 20 to message servers 62. The message servers 62 may be configured to accept new recipients 20, such as new users 14 who generate personal accounts to receive messages 32 from the message sources 18. As a first example, upon receiving an add request to add a new recipient 20, a message server 62 may be configured to generate a new recipient profile 64 that identifies the message sources subscribed by the new recipient 20, and to update the assignment map 154, thereby indicating (e.g., to other message servers 62 of the message server set 152) the assignment of the new recipient 20 to the message server 32. In this regard, additional variations of these techniques may relate to the manner of choosing a message server 62 to which the recipient 20 is to be assigned. As a second example of this fifth aspect, the recipients 20 may be arbitrarily assigned to message servers 62, such as randomly or by user or administrator selection. As a third example of this fifth aspect, recipients 20 may be assigned in order to balance the resource consumption of respective message servers 62, such as by promoting an approximately equivalent number of recipients 20 or an approximately equivalent space usage by the recipients 20 (e.g., where recipients 20 subscribing to more message sources 18 may entail a greater storage of messages 32 having a greater resource consumption.) As a fourth example of this fifth aspect, recipients 20 may be assigned to message servers 62 based on geographic proximity; e.g., if the message server set 152 is distributed across a wide area network, such as a country or continent, recipients 20 may be assigned to the message server 62 in closest proximity in order to reduce network latency.

As a fifth example of this fifth aspect, recipients 20 may be assigned to message servers 62 in a manner that improves the efficient use of computing resources. In particular, among the set of recipients 20, identifying similar recipients 20 and assigning such recipients 20 to the same message server 62 may reduce the number of stored messages 32 and consumed network bandwidth. For example, if, out of a body of 100,000 recipients 20, a cluster of 1,000 recipients 20 subscribes to a particular message source 18, it may be efficient to assign these recipients 20 to the same message server 62, which may receive and store a single copy of the messages 32 received from the message source 18 and distribute such messages to these recipients 20, than to distribute the recipients 20 across many message servers 62, thereby entailing multiple transmissions, the storing of multiple copies, and delivery processing by multiple message servers 62. Such clustering may also improve the performance of the message server set 152 by improving the use of caches; e.g., if a set of recipients 20 subscribe to the same message source 18, a message server 62 to which these recipients 20 are assigned may exhibit improved performance by retaining the messages 32 from the message source 18 in a memory cache for faster and frequent delivery, but this performance improvement may not be achievable if the recipients 20 are distributed across many message servers 62.

This clustering of similar recipients 20 may be achieved in at least two ways. As a first clustering technique, recipients 20 may be assigned to a message server 62 of the message server set 152 based on a predicted shared set of message sources 18 to which these recipients 20 might subscribe. Upon receiving the add request to add a recipient 20 to a message server 62, a determination may be made whether the new recipient 20 is similar to the recipients 20 of a previously identified cluster, such as recipients 20 who enjoy particular sports, who listen to similar types of music, or who engage in particular professions. If the recipient 20 appears similar to any such cluster of recipients 20 previously assigned to a particular message server 62, the message server 62 may accept the new recipient 20 (e.g., by generating a new recipient profile 64 identifying the message sources 18 subscribed by the new recipient 20, and updating the assignment map 154 indicating the assignment of the new recipient 20 to the message server 62.) Alternatively, if a first message server 62 determines that a particular recipient 20 is similar to the recipients 20 assigned to a second message server 62, the first message server 62 may simply forward the add request to the second message server 62.

Figure 12:
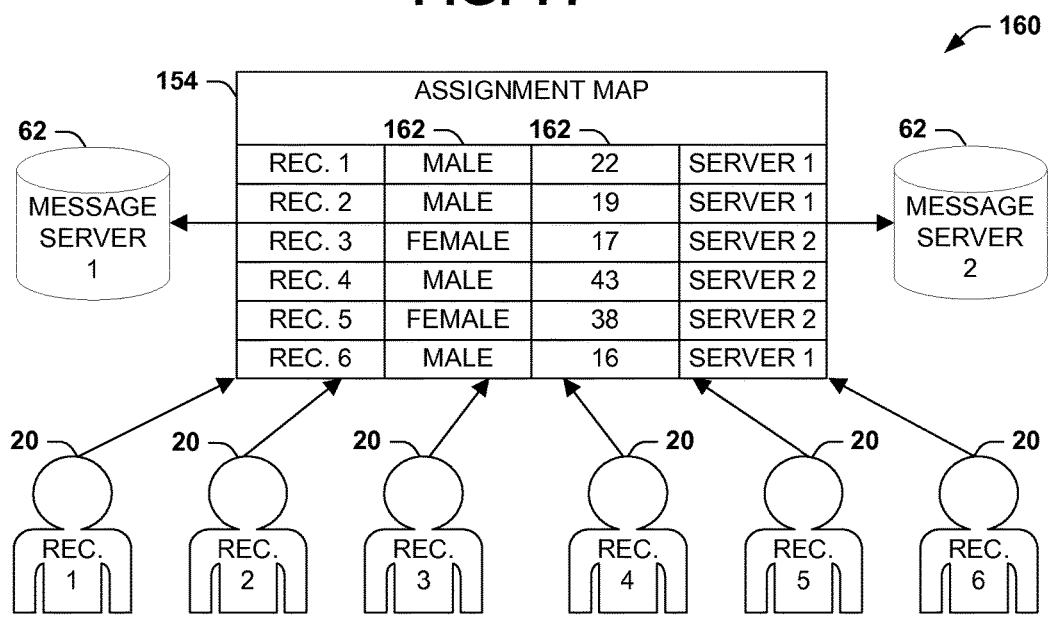
FIG. 12 is an illustration of an exemplary scenario featuring the assignment of users as recipients to message servers according to demographic traits.

FIG. 12 illustrates an exemplary scenario 160 wherein recipients 20 are assigned to message servers 62 based on predictions of the message sources 18 to which such recipients 20 might subscribe. In particular, the predictions in this exemplary scenario 160 involve identifying one or more demographic traits 162 pertaining to the recipients 20 that may be predictive of message sources 18 to which the recipient 20 may subscribe, such as age, gender, geographic location, nationality, or interests. Recipients 20 sharing at least one demographic trait 162 may be assigned to the same message server 62. For example, among the recipients 20 illustrated in this exemplary scenario 160, a first message server 62 is assigned all recipients 20 who are young and male, and who may subscribe to a similar set of message sources 16, while a second message server 62 is assigned recipients who are older or who are female.

A second clustering technique (which may be implemented either alternatively or additionally with other clustering techniques) involves, rather than predicting the message sources 18 to which a particular recipient 20 might subscribe, detecting similarities of existing subscriptions 16 among the recipients 20, and upon identifying a subset of recipients 20 who maintain similar subscriptions 16, reassigning the recipients 20 to a particular message server 62. This detection may be implemented, e.g., by statistical analysis or various artificial intelligence techniques, such as pattern recognition. Once such a similarity of subscriptions 16 among a subset of recipients 20 is detected, the message servers 62 may arrange to consolidate the recipients 20 to a single message server 62. This consolidation may be performed in a decentralized manner; e.g., each message server 62 may endeavor to claim from other message servers 62 any recipients 20 hosted by such other message servers 62 who subscribe to similar message sources 18. For example, when a first message server 62 identifies at least one shared message source 18 that is subscribed by a first recipient 20 hosted by the first message server 62 and a second recipient 20 hosted by a second message server 62, the first message server 62 may send to the second message server 62 a transfer request to transfer the second recipient 20 to the first message server 62. The second message server 62 may oblige by, upon receiving the transfer request, sending the recipient profile 64 of the recipient 20 to the first message server 62, removing the recipient profile 64 from the set of recipient profiles 64 stored by the second message server 62, updating the subscription filter 66, and updating the assignment map 154 to indicate the reassignment of the recipient 20 to the first message server 62. In one such implementation, the message servers 62 may interoperate in many ways to achieve an efficient redistribution; e.g., upon determining that two or more message servers 62 share a set of recipients 20 sharing one or more subscriptions 16 with particular message sources 18, the message servers 62 may choose a particular message server 62 to which the recipients 20 may be advantageously transferred based on various heuristics, such as (e.g.) choosing the message server 62 currently storing the largest share of the recipients 20, having the largest spare capacity (e.g., to which are assigned the fewest other recipients 20), and/or having the closest geographic proximity or available bandwidth with the recipients 20. Alternatively or additionally, a centralized server may facilitate the consolidation by identifying patterns of similar subscriptions 16, choosing an advantageous consolidation of recipients 20, and/or coordinating the transfer of recipients 20 with the message servers 62 currently hosting the recipients 20. Those of ordinary skill in the art may devise many ways of configuring one or more message servers 62 to add recipients 20 while implementing the techniques presented herein.

A sixth aspect that may vary among embodiments of these techniques, and in particular for embodiments involving a configuration of respective message servers 62 of a message server set 152, relates to the manner of receiving and exchanging messages 32 from various message sources 18 among the message servers 62. When a message server 62 receives a message 32 from a message source 18, in addition to delivering the message 32 to recipients 20 subscribing to the message source 18 according to the techniques presented herein, the message server 62 may also be configured to retransmit the message 32 to other message servers 62 for delivery to the other recipients 20 assigned to such other message servers 62. As a first example, the message server 62 may broadcast all such messages 32 to all other message servers 62, but such broadcasting may efficiently utilize the available bandwidth of a network or bus connecting such message servers 62 as the number of messages 32 processed by the message server set 152 increases. As a second example, the message server 62 may retransmit the message 32 only to the other message servers 62 who may deliver the message 32 to at least one recipient 20 assigned thereto and subscribing to the message source 18 of the message 32. In one such embodiment, each message server 62 may share its subscription filter 66 with the other message servers 62 of the message server set 152, and, upon updating the subscription filter 66 (e.g., in view of changes in the assignments of recipients 20 and/or the subscriptions 16 of assigned recipients 20 to message sources 18), may transmit an updated subscription filter 66 to the other message servers 62. Each message server 62 may also store the subscription filters 66 of the other message servers 62, and may refer to such subscription filters 66 to identify the other message servers 62 to which the message 32 is to be retransmitted.

The selective transmission of messages 32 according to this second example of this sixth aspect may significantly improve the efficient utilization of the computing resources of the message server set 152. Additionally, this sharing and retransmission may be implemented according to many topologies, e.g., as a fully interconnected graph where each message store 62 stores the subscription filters 66 of all other message servers 62 and rebroadcasts a received message 32 to all other message servers 62 having at least one subscribed recipient 20, or as an n-tiered network topology involving smaller groups of message servers 62 that exchange subscription filters 66 and/or messages 32 thereamong and with other groups. Various configurations may be comparatively advantageous according to various aspects of the messaging scenario, e.g., based on the number of message servers 62 and messages 32, the rate of change in the message server set 152 or in the subscriptions 16 of recipients 20 to message sources 18, and the comparative values of promptly delivering messages 32 and conserving network bandwidth.

Accordingly, these and other advantages of this second example of this sixth aspect may be achieved by configuring the message servers 62 in the following manner. Upon generating or updating a subscription filter 66, or upon joining a message server set 152, a message server 62 may be configured to send the subscription filter 66 to at least one other message server 62, and in some configurations, to all other message servers 62 of the message server set 152. Upon receiving a second subscription filter 66 from a second message server 66, the message server 62 may be configured to store the second subscription filter 66 of the second message server 62. Upon receiving a message 32 from a message source 18, the message server 62 may examine each of the subscription filters 66 of the other message servers 62 to determine whether at least one recipient 20 assigned to each other message server 62 subscribes to the message source 18, and upon so determining, may forward the message 32 to such other message server 62. Finally, upon leaving the message server set 152 (e.g., in the event that the message server 62 is being decommissioned), the message server 62 may be configured to transfer all recipients 20 assigned to the message server 62 to another message server 62 of the message server set 152, and to request the other message servers 62 of the message server set 152 to remove the subscription filter 66 for the message server 62. According to this configuration, the message servers 62 may interoperate to share subscription filters 66, and to exchange messages 32 in an efficient manner.

A particular feature that may be implemented in such configurations in order to achieve improved efficiency relates to the sending of messages 32 by a popular message source 18, to which many recipients 20 subscribe. For example, in a social network scenario, a particularly popular message source 18, such as a celebrity, may have millions of subscribing recipients 20. For such popular message sources 18, it may be inefficient for a message server 32, upon receiving a message 32 therefrom, to examine the subscription filters 66 of the other message servers 62 to identify the message servers 62 to which are assigned at least one subscribing recipient 20, when many or all such message servers 62 may have at least one such recipient 20. Instead, for these popular message sources 18, greater efficiency may be achieved by transmitting the message 32 to all message servers 62 of the message server set 152. Accordingly, one or more message servers 62 may be configured to identify at least one popular message source 18 that is subscribed by many recipients 20, and upon receiving a message 32 from a popular message source 18, to send the message 32 to the message servers 62 of the message server set 152. In this manner, the computational resources involved in examining the subscription filters 66 of the other message servers 62 may be avoided, since many or all of the other message servers 62 are likely to have at least one subscribing recipient 20.

Figure 13:
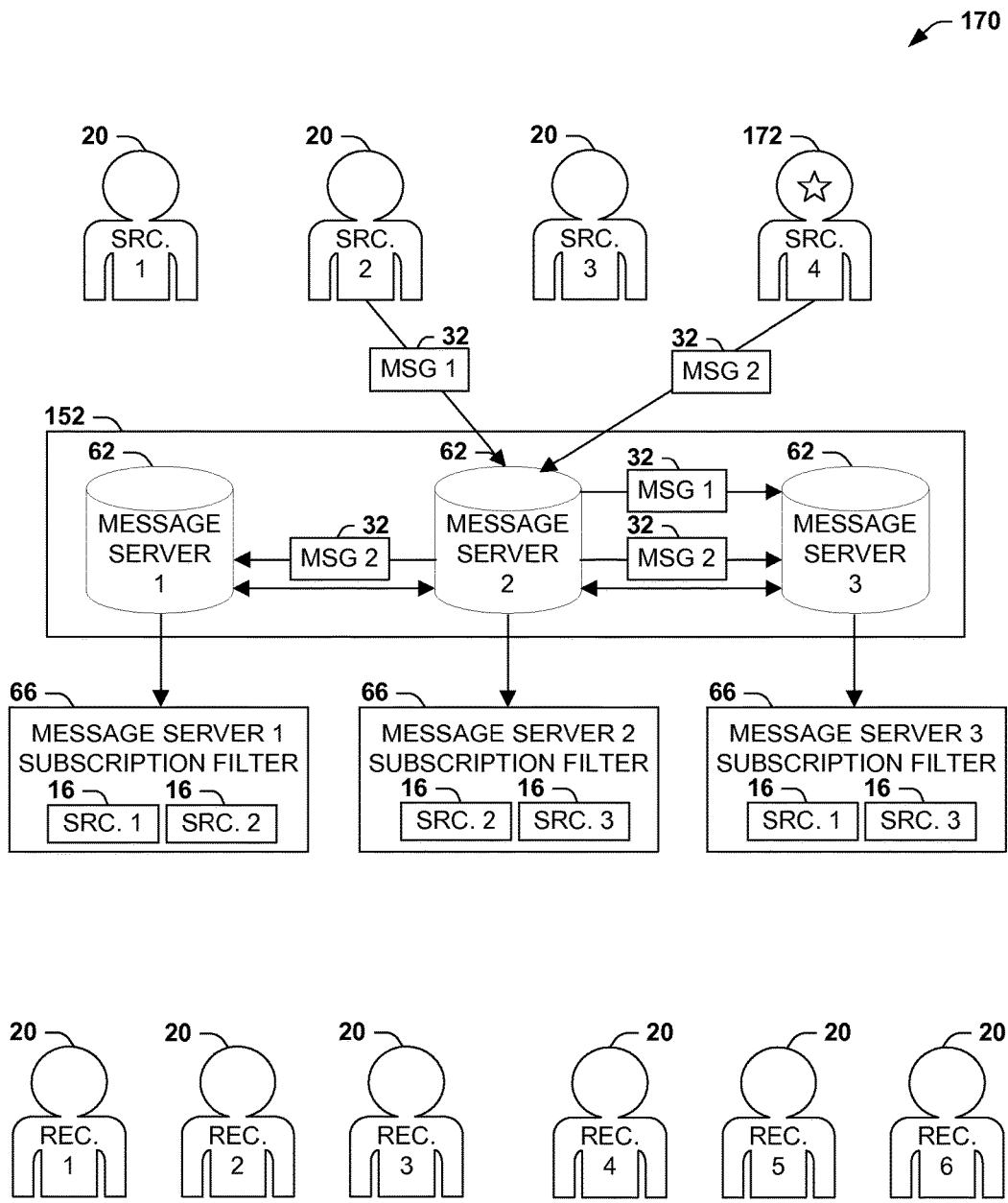
FIG. 13 is an illustration of an exemplary scenario featuring the interoperation of message servers in a message server set to distribute to subscribing recipients a set of messages received from various message sources.

FIG. 13 presents an exemplary scenario 170 featuring a message server set 152 comprising message servers 62 that are configured to exchange messages 32 according to some of the variations presented in this sixth aspect. In this exemplary scenario 170, each message server 62 is assigned a set of recipients 20, and stores a subscription filter 66 identifying the message sources 18 to which at least one assigned recipient 20 subscribes. Each message server 62 is configured to send its subscription filter 66 to the other message servers 62 upon generating or updating the subscription filter 66, or upon joining the message server set 152, and to store the subscription filters 66 received from the other message servers 62. When a message 32 is received from a message source 20, each message server 62 is configured to consult the subscription filters 66 of the other message servers 62 before determining how the message 32 is to be retransmitted. For example, a second message source 20 may send a first message 32 to the second message server 62, and at least one of the recipients 20 assigned to the second message server 62 subscribes to the second message source 20. The second message server 62 may therefore store the first message 32 for delivery to such assigned and subscribing recipients 20. Moreover, the second message server 62 may examine the subscription filters 66 of the first message server 62 and the third message server 62, may determine that the third message server 62 is assigned at least one recipient 20 who also subscribes to the second message source 20 but that the first message server 62 has no such recipients 20, and may forward the first message 32 only to the third message server 62. Additionally, a popular message source 172 may be identified to which many recipients 20 are subscribed, and when a second message 32 is received from the popular message source 172 the second message server 62 may determine that the message source is popular, and may forward the second message 32 to all other message servers 62 without consulting the subscription filters 66 thereof. In this manner, the message servers 62 are configured to interoperate in a manner that utilizes the computing resources (including processing, storage capacity, and network bandwidth) of the message server set 152 in an efficient manner. Those of ordinary skill in the art may devise many ways of exchanging messages 32 among the message servers 62 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 14:
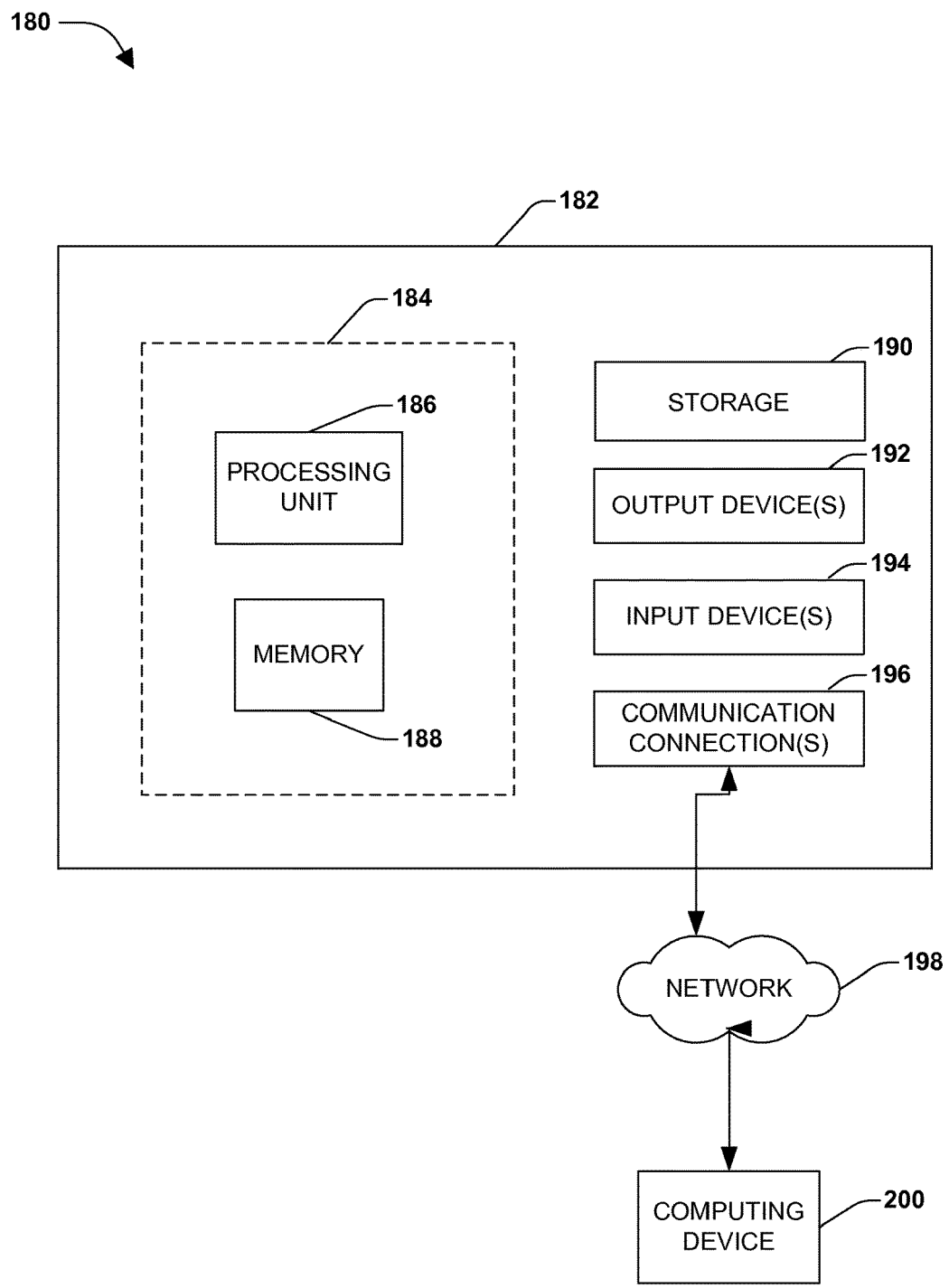
FIG. 14 illustrates an exemplary computing environment wherein one or more of the provisions set forth herein may be implemented.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 180 comprising a computing device 182 configured to implement one or more embodiments provided herein. In one configuration, computing device 182 includes at least one processing unit 186 and memory 188. Depending on the exact configuration and type of computing device, memory 188 may be volatile (such as RAM, for example), non-volatile (such as ROM, flash memory, etc., for example) or some combination of the two. This configuration is illustrated in FIG. 14 by dashed line 184.

In other embodiments, device 182 may include additional features and/or functionality. For example, device 182 may also include additional storage (e.g., removable and/or non-removable) including, but not limited to, magnetic storage, optical storage, and the like. Such additional storage is illustrated in FIG. 14 by storage 190. In one embodiment, computer readable instructions to implement one or more embodiments provided herein may be in storage 190. Storage 190 may also store other computer readable instructions to implement an operating system, an application program, and the like. Computer readable instructions may be loaded in memory 188 for execution by processing unit 186, for example.

The term "computer readable media" as used herein includes computer storage media. Computer storage media includes volatile and nonvolatile, removable and non-removable media implemented in any method or technology for storage of information such as computer readable instructions or other data. Memory 188 and storage 190 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 182. Any such computer storage media may be part of device 182.

Device 182 may also include communication connection(s) 196 that allows device 182 to communicate with other devices. Communication connection(s) 196 may include, but is not limited to, a modem, a Network Interface Card (NIC), an integrated network interface, a radio frequency transmitter/receiver, an infrared port, a USB connection, or other interfaces for connecting computing device 182 to other computing devices. Communication connection(s) 196 may include a wired connection or a wireless connection. Communication connection(s) 196 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 182 may include input device(s) 194 such as keyboard, mouse, pen, voice input device, touch input device, infrared cameras, video input devices, and/or any other input device. Output device(s) 192 such as one or more displays, speakers, printers, and/or any other output device may also be included in device 182. Input device(s) 194 and output device(s) 192 may be connected to device 182 via a wired connection, wireless connection, or any combination thereof. In one embodiment, an input device or an output device from another computing device may be used as input device(s) 194 or output device(s) 192 for computing device 182.

Components of computing device 182 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 182 may be interconnected by a network. For example, memory 188 may be comprised of multiple physical memory units located in different physical locations interconnected by a network.

Those skilled in the art will realize that storage devices utilized to store computer readable instructions may be distributed across a network. For example, a computing device 200 accessible via network 198 may store computer readable instructions to implement one or more embodiments provided herein. Computing device 182 may access computing device 200 and download a part or all of the computer readable instructions for execution. Alternatively, computing device 182 may download pieces of the computer readable instructions, as needed, or some instructions may be executed at computing device 182 and some at computing device 200.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of causing a message server having a processor, a memory, and a subscription filter, to deliver messages respectively generated by a message source to a first user and a second user of the who are serviced by the message server, the method comprising:
   executing, by the processor, instructions that cause the message server to:
      responsive to receiving a message from a message source:
         examine the subscription filter to determine whether at least one-of the first user and the second user subscribes to the message source;
         responsive to determining that at least one of the first user and the second user subscribes to the message source:
            store a copy of the message in the memory, and
            store in the memory an association of the message with the at least one of the first user and the second user who subscribe to the message source; and
      responsive to a receive request from a selected user to receive messages:
         identify a selected message that is associated with the selected user;
         retrieve, from the message store, the copy of the selected message; and
         present the selected message to the user.

2. The method of claim 1, wherein:
   the message server further comprises a social network server in a social network;
   the message source further comprises a third user of the social network authoring at least one message; and
   the user comprising a second user of the social network subscribing to messages of the first user.

3. The method of claim 1, wherein executing the instructions further causes the message server to, responsive to a subscribe request from a selected user to subscribe to a message source:
   update the user profile of the selected user to identify the message source subscribed by the selected user; and
   update the subscription filter to indicate that at least one user assigned to the message server subscribes to the message source.

4. The method of claim 1, wherein the subscription filter further comprises a bloom filter indicating, for respective message sources, whether at least one user assigned to the message server subscribes to the message source.

5. The method of claim 4, wherein updating the subscription filter to indicate that at least one user assigned to the message server subscribes to the message source further comprises: inserting the message source into the bloom filter to indicate that at least one user assigned to the message server subscribes to the message source.

6. The method of claim 4, wherein executing the instructions further causes the message server to:
   responsive to an unsubscribe request from a subscribing user to unsubscribe from a message source, identify a second subscribing user, not comprising the subscribing user, who subscribes to the message source; and responsive to failing to identify a second subscribing user who subscribes to the message source, update the bloom filter to indicate that no users assigned to the message server subscribe to the message source.

7. The method of claim 4, wherein executing the instructions further causes the device to, responsive to a removal request to remove a recipient selected user from the message server:
identify a second user, not comprising the selected user, who subscribes to the message source; and
responsive to failing to identify a second user who subscribes to the message source, update the bloom filter to indicate that no users assigned to the message server subscribe to the message source.

8. The method of claim 4, wherein:
the message server also stores, within respective user profiles of users assigned to the message server, a list of message sources subscribed by the user; and
regenerating the bloom filter further comprises:
evaluate an accuracy of the bloom filter; and
responsive to determining that the accuracy of the bloom filter is below an accuracy threshold, regenerate the bloom filter according to the user profiles of the users assigned to the message server.

9. The method of claim 8, wherein:
the bloom filter initially uses a first hash technique; and
regenerating the bloom filter further comprises: regenerating the bloom filter using a second hash technique that is different from the first hash technique.

10. The method of claim 1, wherein:
the message server is included in a message server set;
respective users of the message sever set are assigned to a selected message server in the message server set; and
the message servers of the message server set share an assignment map indicating an assignment of respective users to a message server in the message server set.

11. The method of claim 10, wherein executing the instructions further causes the message server to, responsive to a receive request from the selected user to receive messages:
using the assignment map, determine whether the selected user is assigned to the message server; and
responsive to determining that the selected user is not assigned to the message server and is assigned to a second message server of the message server set, forward the receive request of the selected user to the second message server.

12. The method of claim 10, wherein executing the instructions further causes the message server to, responsive to an assignment request to assign a new user to the message server:
generate a new user profile identifying the message sources subscribed by the new user; and
update the assignment map indicating an assignment of the new user to the message server.

13. The method of claim 12, wherein:
respective users are assigned to a message server of the message server set based on a predicted shared set of message sources subscribed by the respective users; and
executing the instructions further causes the message server to, responsive to the add request to add the new user to the message server set:
identify, among the message servers of the message server set, a selected message server for which the new user shares a predicted shared set of message sources with other users assigned to the selected message server; and
update the assignment map indicating an assignment of the new user to the selected message server.

14. The method of claim 13, wherein predicting the predicted shared set of message sources subscribed by the users of the message server set further comprises:
for respective users, identifying at least one demographic trait that is predictive of message sources that may be subscribed by the user; and
assigning to a message server the users of the message server set who share at least one shared demographic trait.

15. The method of claim 10, wherein executing the instructions further causes the message server to, responsive to identifying at least one shared message source subscribed by a first user who is hosted by the message server and a second user who is hosted by a second message server, send, to the second message server, a transfer request to transfer the second user from the second message server to the message server.

16. The method of claim 10, wherein executing the instructions further causes the message server to:
responsive to receiving a second subscription filter from a second message server, store the second subscription filter of the second message server; and
responsive to receiving a message from a message source, for respective second subscription filters:
examine the second subscription filter to identify at least one user who is assigned to the second message server and who subscribes to the message source, and
responsive to identifying the at least one user who is assigned to the second message server and who subscribes to the message source, forward the message to the second message server.

17. The method of claim 16, wherein executing the instructions further causes the device to, responsive to joining the message server set, send the subscription filter to at least one other message server of the message server set.

18. The method of claim 16, wherein executing the instructions further causes the device to, responsive to leaving the message server set:
for respective users assigned to the message server, transfer the user to another message server of the message server set; and
request at least one second message server of the message server set to remove the subscription filter for the message server.

19. The method of claim 16, wherein executing the instructions further causes the message server to:
identify a popular message source that is subscribed by many users of the message server set; and
responsive to receiving a message from the popular message source, send the message to the message servers of the message server set.

20. The method of claim 1, wherein executing the instructions further causes the message server to, responsive to receiving a message from a message source having zero users of the message server who are subscribed to the message source according to the subscription filter, discard the message.

* * * * *